United States Patent [19]
Lazarus et al.

[11] Patent Number: 6,134,532
[45] Date of Patent: Oct. 17, 2000

[54] SYSTEM AND METHOD FOR OPTIMAL ADAPTIVE MATCHING OF USERS TO MOST RELEVANT ENTITY AND INFORMATION IN REAL-TIME

[75] Inventors: Michael A. Lazarus, Del Mar; William R. Caid, San Diego; Richard S. Pugh; Bradley D. Kindig, both of Poway; Gerald S. Russell, San Diego; Kenneth B. Brown, San Diego; Ted E. Dunning, San Diego; Joel L. Carleton, San Diego, all of Calif.

[73] Assignee: Aptex Software, Inc., San Diego, Calif.

[21] Appl. No.: 08/971,091

[22] Filed: Nov. 14, 1997

[51] Int. Cl.[7] .................................................. G06F 17/60
[52] U.S. Cl. .................................. 705/14; 705/1; 705/14; 705/26
[58] Field of Search .................................. 705/14, 10, 1, 705/27, 20, 26; 707/532

[56] References Cited

U.S. PATENT DOCUMENTS

| | | | |
|---|---|---|---|
| 4,723,212 | 2/1988 | Mindrum et al. ........................ | 705/14 |
| 4,833,308 | 5/1989 | Humble .................................. | 235/383 |
| 4,870,579 | 9/1989 | Hey ......................................... | 705/27 |
| 4,870,597 | 9/1989 | Seki et al. .............................. | 700/187 |
| 4,970,681 | 11/1990 | Bennett ................................. | 707/3 |
| 4,996,642 | 2/1991 | Hey ......................................... | 705/27 |
| 5,331,544 | 7/1994 | Lu et al. ................................. | 705/10 |
| 5,353,218 | 10/1994 | De Lapa et al. ........................ | 705/14 |
| 5,459,306 | 10/1995 | Stein et al. ............................. | 235/383 |
| 5,515,270 | 5/1996 | Weinblatt ................................ | 705/14 |
| 5,583,763 | 12/1996 | Atcheson et al. ...................... | 707/3 |
| 5,619,709 | 4/1997 | Caid et al. .............................. | 707/532 |
| 5,621,812 | 4/1997 | Deaton et al. .......................... | 382/100 |

OTHER PUBLICATIONS

White Paper, "Building Customer Loyalty and Profitable 1–to–1 Customer Relationships with Net Perception's GroupLens™ Recommendation Engine,"Copyright 1997, Net Perceptions, Inc.

Firefly, "Building Relationships Intelligently: The Firefly Software Tools,"Copyright 1997, Firefly Channel Partners Seminar.

Greening, "Improving Group Cohesion and Marketing Effciency with Like–Minded People, A White Paper on LikeMinds People Server 2.1" Copyright 1997, LikeMinds, Inc.

Lashkari et al., "Collaborative Interface Agents," MIT Press, vol. 1, 1994, pp. 444–449.

Shardanand et al., "Social Information Filtering: Algorithms for Automating 'Word of Mouth'," Human Factors in Computing Systems, CHI '95 Conference Proceedings, 1995, pp. 210–217.

*Primary Examiner*—Emanuel Todd Voeltz
*Assistant Examiner*—George D. Morgan
*Attorney, Agent, or Firm*—Knobbe, Martens, Olson & Bear LLP

[57] ABSTRACT

A system and method for selecting and presenting personally targeted entities such as advertising, coupons, products and information content, based on tracking observed behavior on a user-by-user basis and utilizing an adaptive vector space representation for both information and behavior. The system matches users to entities in a manner that improves with increased operation and observation of user behavior. User behavior and entities (ads, coupons, products) and information (text) are all represented as content vectors in a unified vector space. The system is based on an information representation called content vectors that utilizes a constrained self organization learning technique to learn the relationships between symbols (typically words in unstructured text). Users and entities are each represented as content vectors.

85 Claims, 23 Drawing Sheets

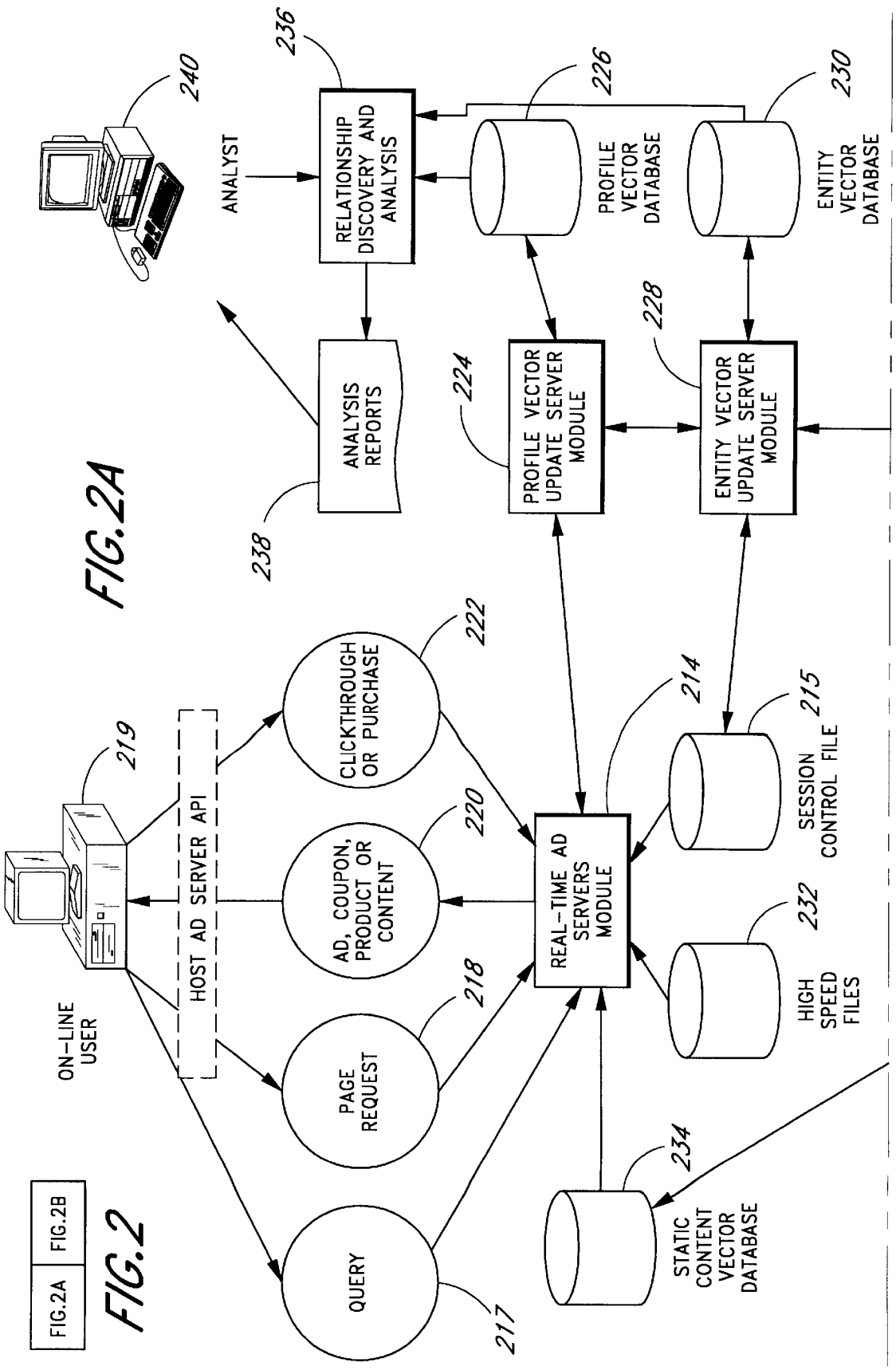

if $\left(q\_score(Q_{uid}, A_1, ..., A_a) > p\_score(P_{uid}, A_1, ..., A_a)\right)$ {

$$[m, n, adidone] = \arg\max_{i,j,adid}\left[q_i \cdot a_j^{(adid)} Value_{adid} \times I(q_i \cdot a_j^{(adid)} > threshold_{query})\right]$$

$$r = \arg\max_j q_m \cdot p_j;$$

$$p_r = (1 - a_{profile})p_r + a_{profile}(q_m - \mu_{query});$$

$$p_r = \frac{p_r}{|p_r|};$$

— 2276 if (bClickthru) {

$$[k, l] = \arg\max\left[\frac{p_i \cdot a_j^{(adidone)}}{|p_i||a_j^{(adidone)}|}\right];$$ — 2278

$$a_n^{(adidone)} = (1 - a_{ad})a_n^{(adidone)} + a_{ad}(q_m - \mu_{query});$$

$$a_n^{(adidone)} = \frac{a_n^{(adidone)}}{|a_n^{(adidone)}|};$$

$$p_k = (1 - a_{profile})p_k + a_{profile}(q_i^{(adidone)} - \mu_{ad});$$ — 2280

$$p_k = \frac{p_k}{|p_k|};$$

$$\mu_{ad} = (1 - \varepsilon_{ad})\mu_{ad} + \varepsilon_{ad} a_n^{(adidone)};$$

}

$$\mu_{query} = (1 - \varepsilon_{query})\mu_{query} + \varepsilon_{query} q_m;$$

$$\mu_{profile} = (1 - \varepsilon_{profile})\mu_{profile} + \varepsilon_{profile} \frac{p_r}{|p_r|};$$ — 2282

} else {
⋮

*FIG. 19A*

$$[m,n,\text{adidone}] = \max_{i,j,\text{adid}} \left[ p_i \cdot a_j^{(\text{adid})} \text{Value}_{\text{adid}} \right]$$

$$q = \arg\max q_j \cdot p_m;$$

$$p_m = (1-a_{\text{profile}})p_m + a_{\text{profile}}(q_q - \mu_{\text{query}});$$

$$p_m = \frac{p_m}{|p_m|};$$

if (bClickthru) {

$$a_n^{(\text{adidone})} = (1-a_{\text{ad}})a_n^{(\text{adidone})} + a_{\text{ad}}(p_m - \mu_{\text{profile}});$$

$$a_n^{(\text{adidone})} = \frac{a_n^{(\text{adidone})}}{|a_n^{(\text{adidone})}|};$$

$$p_m = (1-a_{\text{profile}})p_m + a_{\text{profile}}(a_n^{(\text{adidone})} - \mu_{\text{ad}});$$

$$p_m = \frac{p_m}{|p_m|};$$

$$\mu_{\text{ad}} = (1-\varepsilon_{\text{ad}})\mu_{\text{ad}} + \varepsilon_{\text{ad}} a_n^{(\text{adidone})};$$

}

$$\mu_{\text{query}} = (1-\varepsilon_{\text{query}})\mu_{\text{query}} + \varepsilon_{\text{query}} q_q;$$

$$\mu_{\text{query}} = (1-\varepsilon_{\text{profile}})\mu_{\text{profile}} + \varepsilon_{\text{profile}} p_m;$$

} /*else*/ {

FIG. 19B

| NAME | TYPICAL | VALUE RANGE | DESCRIPTION |
|---|---|---|---|
| $threshold_{query}$ | 0.5 | 0.25–0.75 | Threshold by which query vector will be used instead of profile vector. |
| $\alpha_{profile}$ | 0.1 | 0.05–0.5 | Learning rate for profile update. |
| $\alpha_{ad}$ | 0.01 | 0.005–0.1 | Learning rate for ad update. |
| $\varepsilon_{query}$ | 1.0e−06 | 1.0e−05 – 1.0e−07 | Update rate for query universe estimate of the mean. |
| $\varepsilon_{profile}$ | 1.0e−06 | 1.0e−05 – 1.0e−07 | Update rate for profile universe estimate of the mean. |
| $\varepsilon_{add}$ | 2.5e−05 | 1.0e−04 – 1.0e−06 | Update rate for ad universe estimate of the mean. |
| $\Delta_{profile}$ | 0.01 | 0.001–0.5 | Forgetting factor for profiles. |
| $\Delta_{ad}$ | 0.01 | 0.001–0.5 | Forgetting factors for ads. |
| $\mu_{ad}$ | 0 | Application dependent | Mean of ads. |
| $\mu_{profile}$ | 0 | Application dependent | Mean of profiles. |
| $\mu_{query}$ | 0 | Application dependent | Mean of queries. |

*FIG. 20*

SYSTEM AND METHOD FOR OPTIMAL ADAPTIVE MATCHING OF USERS TO MOST RELEVANT ENTITY AND INFORMATION IN REAL-TIME

BACKGROUND OF THE INVENTION

1. Field of Invention

The invention relates to associating entities and information with behavior. More particularly, the invention relates to a system and a process for targeting and delivering advertising, coupons, products, or informational content to users based upon observed behavior.

2. Description of the Related Technology

The widespread availability of the World Wide Web (web) and Internet services has resulted in a unique set of advertising opportunities. Unlike conventional "broadcast" media, such as television and radio, the web is a "narrowcast" medium that allows the user to have higher levels of control over the information they receive. Since users can control the retrieval of information, the advertising techniques utilized in the conventional broadcast model has become less effective and can alienate potential customers as a result of the "shotgun" effect. The potential of selectively targeting advertisements on a user-by-user basis has been unrealized due to the difficulty in performing meaningful targeting of customers. The current generation of web ad selection engines utilize a number of partially successful techniques to target customers. Typically, the effectiveness of these techniques is measured in terms of audience response rates. Audience response, also called "clickthrough", is evaluated by counting the number of users that click on a "banner advertisement" contained on a web page which is presented to the user. Clicking on the banner advertisement typically takes the user to the web site of the advertiser where additional information about a product or service is provided. In the current Internet advertising environment, clickthrough is the best measure of the effectiveness of advertising techniques. Consequently, the value of advertising is directly related to the effectiveness of the ad. Therefore, the maximization of clickthrough is of paramount importance for most web sites for both practical and financial reasons.

Some current banner advertising selection techniques are listed in the tables below. These techniques are divided into two classes. The first class of advertising selection techniques, shown in Table 1, use simplistic first generation techniques that are based only on static a priori information. The second class of advertising selection techniques, shown in Table 2, utilizes some of the techniques used in the more sophisticated second generation ad selection systems which may take into account some measure of user behavior, such as a user query, or make use of predisclosed user preferences. However, these more sophisticated objectives often only complicate the problem. In Table 1 and Table 2 certain disadvantages of each method are given, however, the Tables are not meant to be all inclusive so not all disadvantages may be shown.

TABLE 1

First Generation Ad Targeting Techniques.

| Method | Disadvantage |
| --- | --- |
| Domain name of user browser | Provides no significant user insight; Does not account for user behavior |

TABLE 1-continued

First Generation Ad Targeting Techniques.

| Method | Disadvantage |
| --- | --- |
| Browser type | Implies user behavior is related to usage domain<br>Provides poor clickthrough<br>Implies user behavior is related to usage browser type/version<br>Provides poor clickthrough |
| System type | Implies user behavior is related to system type<br>Provides poor clickthrough |
| Service provider | Implies user behavior is related to usage domain<br>Provides poor clickthrough |
| Geography/location | Requires up-to-date knowledge base of IP address versus location<br>Provides poor clickthrough<br>Provides no significant user insight |
| Site SIC Code | Requires up-to-date knowledge base of SIC code versus IP address<br>Provides somewhat improved user clickthrough<br>Provides no significant user insight |
| Company size | Requires up-to-date knowledge base of SIC code versus IP address<br>Provides no significant user insight<br>Implies user behavior is related to size of company<br>Provides poor clickthrough |
| Knowledge base techniques | Requires maintenance of knowledge base<br>Costly to maintain<br>Cannot incorporate observed user behavior |

TABLE 2

Second Generation Ad Targeting Techniques.

| Method | Disadvantage |
| --- | --- |
| User registration information | Requires user willingness to disclose information<br>Requires many judgments on products for effective operation<br>Requires a substantial preexisting judgment database |
| Search key words | Misses ads that are conceptually close but do not contain key word<br>Restricts available inventory<br>Requires careful choice of key terms |
| Hand targeting of ads to sites or pages | Very labor intensive; does not scale well<br>Humans not good at manual targeting for large numbers of ads |
| Hand analysis of site or locations in a site | Very labor intensive; does not scale well<br>Humans not good at manual analysis of large numbers of sites |
| Random presentation | Poor response rates<br>Alienates users |
| Date/time | Poor response rates |
| Hand analyzed sites | Very labor intensive<br>High cost |

In the current web environment, users utilize search services to find relevant or interesting information. These search services provide a potential focus for the identification of user behavior as defined by the searches they execute, the web pages they view and positions in the directory hierarchy they visit. However, existing banner advertising selection techniques fail to analyze this behavior when selecting an advertisement. These search services provide an opportunity for presentation of user specific advertising.

The conventional techniques shown in Table 1 and Table 2, use hand coded associations and lists to perform customer "targeting." Certain techniques may use only the current user query as part of ad targeting. Each of the methods shown in Tables 1 and 2 may be associated with five general categories of advertisement selection techniques. These categories include:

(i) rule-based categorization;
(ii) keyword based ad selection;
(iii) assigning ads to individual web pages or sites;
(iv) assigning ads to branches in hierarchical organizations of pages; and
(v) collaborative filtering.

A description of each category is provided below.

Rule Based Ad Selection

Rule based ad selection uses available information and rules to select an appropriate ad. This technique can be effective if large numbers of rules are manually coded and the rule developer has a deep understanding of the problem domain. However, one problem with this system is that human intellectual effort is required to write or maintain the rules. The development of a rule base may be very expensive and time consuming.

Additionally, the rules for advertisement selection are limited to available variables with discrete values and provide "brittle" decision boundaries. These decision boundaries are typically binary and are frequently mishandled.

Rule based ad selection requires extensive knowledge about the targeted operating domain. Even with computer-aided tools, a knowledge engineer is required to develop the rules and administer the system. Furthermore, humans have demonstrated time and again, that they are poor at encoding rules. This observation is particularly true when large numbers of variables are encompassed within the scope of the problem being modeled.

Keyword Based Ad Selection

In keyword based ad selection systems, the ads are selected on the basis of one or more user provided words. When an observed user behavior (typically a user issued query) contains a known keyword, one of the ads, which is manually associated with the keyword, is selected for display. This technique provides good response rates for the keywords chosen. However, a major drawback with this approach is the system administrator must manually choose the keywords associated with each ad. This technique, based on intellectual effort and deep knowledge of the ad-specific domain, is time consuming and error prone. Additionally, the "inventory" of keywords at a site quickly becomes sold out. Lastly, with keyword based ad selection techniques, the ad selection process does not account for previous user behavior. The ad selector only uses a set of human-selected keywords in the current inventory based upon the current search query. Synonyms of user provided words are not automatically targeted without a thesaurus or synonym list.

Assigning Ads To Individual Pages

Ads are sometimes manually targeted to individual web pages. This method requires human intellectual effort to match an advertisement to a web page. However, such effort is usually prohibitive in large scale sites containing thousands of web pages.

Assigning Ads to Branches with Hierarchies of Pages

Ads are sometimes manually targeted to hierarchies or categorizations of pages called page ontologies. This technique may provide effective performance if the human making the assignment of the ad to a branch of the hierarchy has a good feel for the content of the site and understanding of the intended viewer. However, human intellectual effort is required to select the appropriate branch or category for the ad.

Assigning Ads To Web Sites

Ads are sometimes manually targeted to all of the pages in a web site. However, as was seen with many of the other systems, human intellectual effort is required to select the appropriate ad for the web site. This method is inflexible in that an advertiser cannot automatically target an ad to the best pages within a site. Typically, advertisers want to display different ads for each page in a site. Another problem with assigning ads to web sites is that the ads served to the user are not context dependent in that they fail to utilize user specific information.

Collaborative Filtering Techniques

Collaborative filtering (CF) techniques have been proposed for the problem of selectively targeting specific ads to web users. The CF approach requires large numbers of users to formally register with the system and make preference judgments about the quality of the ads, coupons and information content they receive. Under certain limited circumstances, this technique may provide some degree of effective matching in small scale tests. However, for large tasks, such as found on the Internet, the algorithms become both computationally intractable and impractical. Additionally, the CF techniques perform best when the universe of entities are static rather than time evolving. In the Internet market, static content is the exception, not the norm. Furthermore, the utility of the CF approach is directly related to the numbers of users that have made preference judgments. Typically, users are reticent to spend a substantial amount of effort which is required to make these judgments both because of personal time limitations and concerns about privacy. As such, data acquisition becomes a major problem for the advertiser.

CF solutions typically require a knowledge engineer to implement a system of sparse vectors of a very high dimension, where the dimension of the problem space is equal to the number of entities under consideration. However, this solution has been found to be computationally intractable. Another problem with CF techniques is that the ad selection software is examining for orthogonal relationships which requires a substantial number of statistically complicated steps. The ad selection software must find close neighbors in the vector space and suggesting coordinates not in common between the neighbors.

The existing ad selection systems, particularly in coupon and print media advertising, fail to address the interactive nature of the Internet and electronic commerce. Advertisers need to be able to identify users of specific interests, track those interests over time and disseminate, in a highly selective way, information, advertising, coupons and product offerings that will be of interest to the user. Additionally, advertisers need to track user interests and behavior in a real-time manner.

Therefore, advertisers need a system which is sensitive to user behavior for targeting advertising, coupons, products and information content. This system should enable the targeted marketing in real-time and to a granularity of an individual user as well as groups of users that have similar behavioral characteristics.

SUMMARY OF THE INVENTION

The present invention includes a system and method for delivering targeted entities, such as advertising, coupons, products and information content, to users based on tracking observed behavior. The system model is an adaptive vector space representation for entities, information and behavior. The system matches users to entities in a manner that improves with increased operation and observation of user behavior.

The present invention uses an informational representation called entity or content vectors. The content vectors are a high dimensional, real vector representation that encodes contextual similarity. The system utilizes a constrained self-organization learning algorithm to learn the relationships between symbols which are typically words in unstructured text. This learning algorithm discovers relationships between words or symbols from a set of training examples for a domain of interest and assigns a unique content vector to each symbol. The resulting representation is such that symbols that appear in a similar context will possess content vectors that point in similar directions in this high dimensional content vector space.

Web pages, banner advertisements, coupons, and any other textual or symbolic information, are represented as a summary content vector by forming the normalized weighted vector sum of the content vectors of the words (symbols) in the page or description of the product or service. These summary content vectors have the property that pages that discuss similar information have summary content vectors that point in similar directions.

The actions of each user are represented by profile vectors. Typical user actions include, but are not limited to: issuing queries requesting or reading pages, visiting Internet sites, responding to ads, and redeeming coupons and purchasing products. A user's profile vector is configured to track observed behavior by using the content vector representation of the associated actions. For example, when the user requests a page of information, the user's profile vector is adjusted based upon the entity vector of the requested page.

The user profile vector is utilized as the mechanism for selecting the best entity (e.g., ad, coupon, product or information) to present to the user. The user profile vector is compared to each active entity vector, and the closest entity content vector is selected for display to the user.

The present system also performs the optimal adaptive positioning of entity vectors. If a user is presented a banner ad and requests more information by clicking the mouse on it, the entity vector for the ad is adjusted using the user's profile vector. Additionally, the user profile vector is adjusted using the ad content vector. This mutual adaptation allows optimum positioning of ads relative to users.

In this system, the user profile vectors evolve through a user's usage of the system. Clustering and classification techniques are applied to the adapted profile vector set to discover behavior patterns that are utilized for focused marketing campaigns.

Likewise, ad and coupon entity vectors evolve as a result of user behavior. These evolved vectors encode summary characteristics of the users who clicked on the ad or redeemed the coupon. These summary characteristics are used to modify product positioning and discover the characteristics of the users who are interested in the product or service.

The system is fully automated and does not require any rules for operation and is based on self organizing neural network techniques. Additionally, the system operates using tacit user observation and does not require explicit user judgments for correct operation.

BRIEF DESCRIPTION OF THE DRAWINGS

FIGS. 19a and 19b are the equation flow diagrams for the fixed rate learning algorithm performed by the profile vectors update module and the entity vector update module shown in FIG. 2.

FIG. 20 is a chart containing a summary of sample run time parameters for the fixed rate learning algorithm shown in FIGS. 19a and 19b.

DETAILED DESCRIPTION OF THE PREFERRED EMBODIMENTS

The following presents a detailed description of certain specific embodiments of the present invention. However, the invention can be embodied in a multitude of different ways as defined and covered by the claims. In this description, reference is made to the drawings wherein like parts are designated with like numerals throughout.

Figure 1:
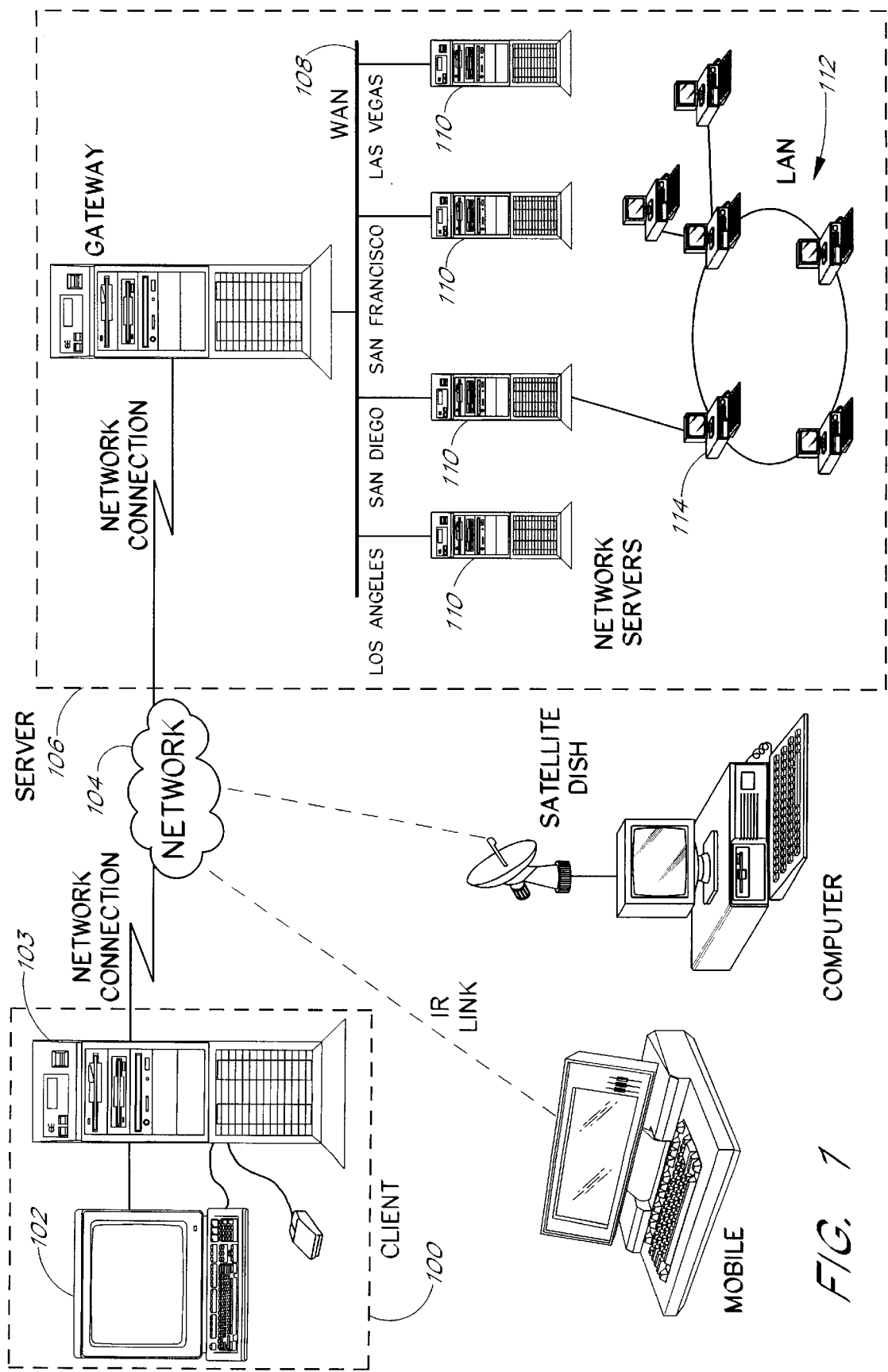
FIG. 1 is a functional block diagram illustrating a computer environment that may be associated with the present invention.

FIG. 1 is a block diagram illustrating a computer environment associated with the present invention. A client computer 100 has a monitor 102 and a processing unit 103. The processing unit 103 includes a data storage.

The client computer 100 stores information that may be exported to other computing devices through a network 104. The network 104 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration.

When a remote user requests information from the network 104, the client computer 100 displays an advertisement with the requested information. Based on a request from the client computer 100, a server 106 may select an appropriate advertisement to display to the user based upon the user's observed behavior.

Figure 2B:
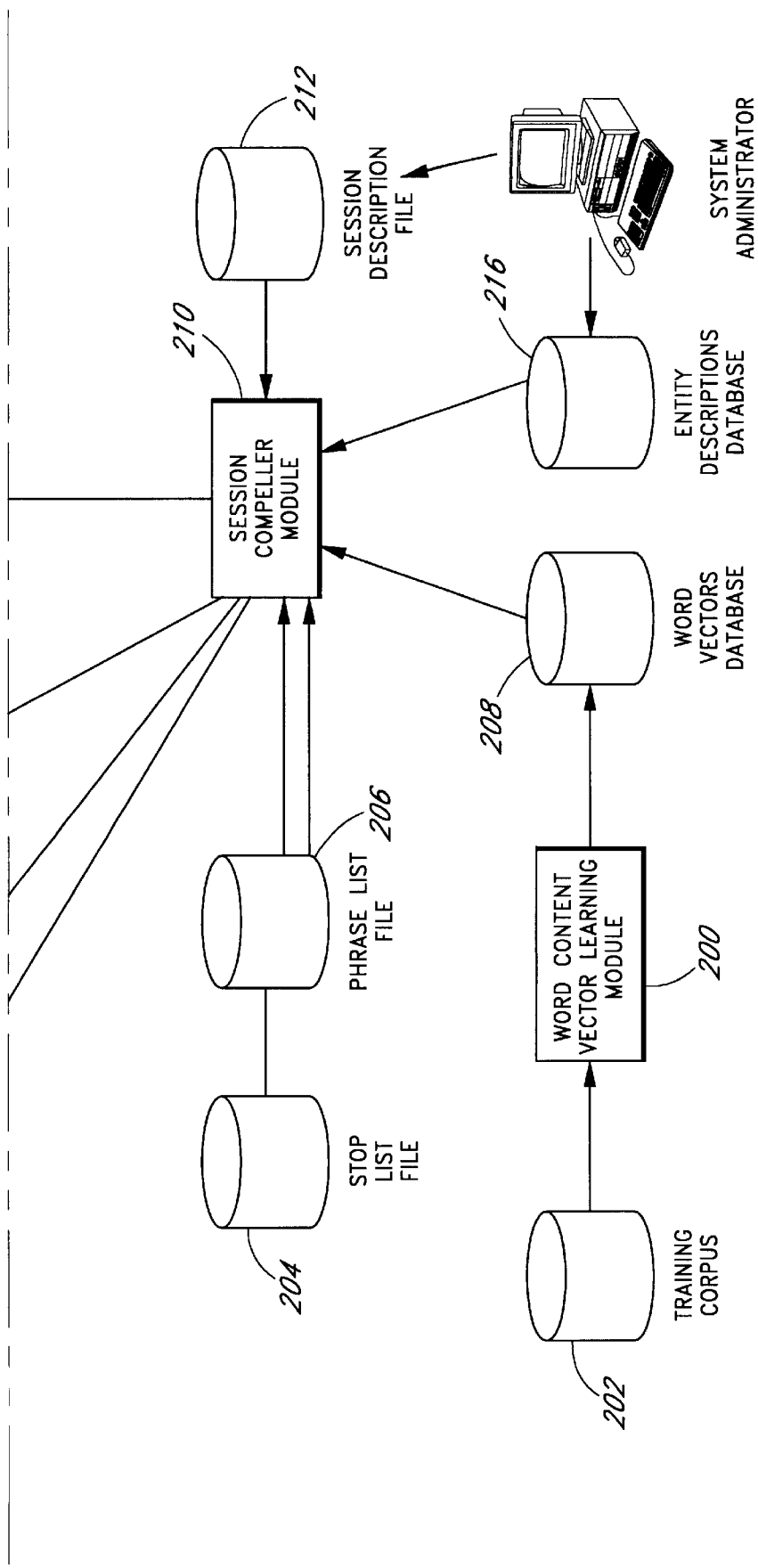
FIG. 2 is a functional block diagram illustrating the processing and data components of the present invention.

In one implementation, the server 106 includes a gateway which is connected to a WAN 108. The WAN 108 has a plurality of network servers 110. One of the network servers 110 is connected to a LAN 112 comprising a plurality of computers 114. The system software that selects the advertisement may be located on one the network servers 110 or another computer in the network 104. In one embodiment of the invention, the advertisement selection software executes in part on a plurality of the network servers 110. In another embodiment of the invention, the advertisement selection software executes on a plurality of the computers 114 on the LAN 112. In yet another embodiment of the invention, the advertisement selection software resides on the client computer 100. It is important to understand that the advertisement selection system of the present invention may be hosted on any computing device so long as a communication pathway exists between the advertisement selection software and the requester of the advertisement FIG. 2 is a functional block diagram illustrating the processing and data components of the present invention. The following description focuses on the system's ability to deliver advertising, specifically banner advertising over the Internet. However, the techniques utilized in this invention are general in nature and can be applied to any type of entity or information. Furthermore, the network environment need not be the Internet as indicated previously.

The present invention employs vector modeling of information so as to identify relationships among the informational items or entity vectors. A process for making and using entity vectors is described in the U.S. Pat. No. 5,619, 709 filed Nov. 21, 1995, entitled "SYSTEM AND METHOD OF CONTEXT VECTOR GENERATION AND RETRIEVAL" to Caid, et al.

This entity vector generation scheme is designed to produce content vectors. In an application to words, for instance, the scheme generates one vector per word, which represents the relative proximity of a meaning or content among words or documents in a quantitative and geometric manner. The system then creates an entity vector based upon the words in the entity and their associated word content vectors. Thus informational items having similar meanings have closely aligned vectors, while informational items having dissimilar meanings have approximately orthogonal vectors.

In the following description, the words "content vectors" and "entity vectors" are used synonomously. Both terms refer to a vector that is associated with certain content information, ad, coupon, solicitation, or product, for instance.

The following description is divided into the sections: (1) System Component Overview, (2) Word Content Vector Learning Module, (3) Session Compiler Module, (4) Real-Time Ad Server Module, (5) Profile Vector Update Server Module, (6) Entity Vector Update Server Module, (7) Profile and Entity Adaptation Algorithms, (8) Calculation of Entity Inventory Weighting (Cost Model), and (9) Relationship Discovery and Analysis Processing Module.

System Component Overview

Beginning the discussion by reference to the bottom of FIG. 2, a word content vector learning module 200 creates a set of word content vectors from a domain relevant training corpus 202, a stop list file 204, and a phrase list file 206. The stop list file 204 contains a list of words, word fragments and phrases for the word content vector learning module 200 to ignore. The phrase list file 206 is a list of words that the word content vector learning module 200 groups together. The training corpus 202 is the set of informational objects used to train the word vectors. The functions of the training corpus 202, the stop list file 204, and the phrase list file 206 are further described below.

When the word content learning process is complete, there is one word content vector in a word vector database 208 for each word in the training corpus 202 that is not in the stop list 204. These word content vectors have the property that words that are used in a similar context have content vectors that point in similar directions in the high dimensional content vector space. The word content vectors serve as the basis for the ad selection operations performed by the present system during its operation. The word content vector learning process is performed once as part of the initialization process. However, these vectors can be updated if desired. Normally, the word content vectors are static during normal operation of the invention, since the meaning of words in the English language evolves slowly over time.

A session compiler module 210 takes a set of session control information, in the form of structured text from a session description database 212, and transforms the text into control commands for a real-time ad server (RTAS) module 214 in a session control file 215. Typical information processed during the compilation process includes the number of active ads, the number of allowable impressions for each ad, start and stop times, and dates for showing each ad. The session compiler module 212 may be omitted from the system if such functionality is not needed.

The present invention then computes an initial entity vector for each ad or entity in the system. In most cases, this entity vector is based on a textual description of the entity which is located in an entity description database 216. For instance, if the entity is an ad for a car, the words in the advertisement are used to determine the entity vector. The entity vector is computed as a normalized weighted sum of the word content vectors that are in the advertisement. A textual description of any item can be used as the initial condition for the entity vector. Since entity vectors can evolve during system operation, the initial condition of the entity vector can be null, and no textual description of the entity is required for system operation. However, in normal operation, this evolution may require substantial time if system usage rate is low and as a consequence, the preferred embodiment would start with any reasonable text description as an initial condition.

In the present invention, more ads can be sold in a thematic region of interest than in previous systems since all ads are selected on the basis of vector comparisons and not exact matches, thus increasing the available inventory. For example, the provider of the present invention could sell an ad slot based upon the regions of the vector hyperspace close to the words in the ad and not just a selected set of words.

The entity vector approach also allows administrators to effectively setup ad definitions without special skills or domain knowledge, thus improving overall system performance without the requirement for domain experts. The present invention automatically targets an ad to the best pages within a site, not just the site as a whole. As a consequence of this feature, different ads may be associated with the same page at a site. In addition, the present invention automatically selects the most relevant pages within a hierarchy or category for a particular ad. Alternatively, the system can be configured to serve the best ad independent of any ontology that might be present and based upon only on matching to observed user behavior.

In the present invention, the ads served to the user are context dependent in that they depend on both the contents of the page, the current user action and the historical user profile. The entity vector approach provides a solution which is compact and adaptive. The entity vector representation requires a much smaller amount of data for training as compared to the collaborative filtering approaches. Additionally, the multidimensional entity vector representation of the present system leads to superior generalization capabilities as compared to the collaborative filtering approaches.

Referring again to FIG. 2, the real-time ad server (RTAS) module 214 is the engine which observes the user behavior, and based upon that behavior, selects the appropriate ad to present to the user computer 219 located at the top of the figure. The RTAS module 214 uses the current user action, the user's profile vector and the active set of entity vectors in selecting the appropriate advertisement. The RTAS module 214 uses vector proximity calculations such as inner product to determine the optimal ad to display to the user. However, other distance metrics may also be employed If the RTAS module 214 detects that a user has performed an "adaptation event" on the client computer 219 such as issuing a query 217, requesting a page 218, purchasing a product or clicking on an ad 222, the RTAS module 214 sends an update message to the a profile update server (PVUS) module 224 or an entity update server (EVUS) module 228. The RTAS module 214 utilizes a static content vector database 234 and a high speed file 232 to hold working values of the entity or ad vectors. Upon the selection of the proper entity, the RTAS module 214 sends the selected ad to the client computer 219.

The PVUS module 224 adapts the user profile vectors in response to a request from the RTAS module 214. A profile vector for each user is stored in a profile vector database 226. This adaptation process moves the user profile vector in the direction of the entity vector associated with the adaptation event. For instance, if the user clicks on an ad, the user profile vector is moved a small step in the direction of the entity vector for the ad.

The EVUS module 228 performs a nearly identical action as the PVUS module 224, but performs the operation on the entity vectors for advertisements. Each entity vector is stored in an entity vector database 230. For example, if the user clicks on an ad, the entity vector for the user selected ad is moved a small step in the direction of the user's profile vector.

A relationship discovery and analysis (RDA) module 236 performs processing actions on the contents of both the profile vector database 226 and the entity vector database 230 to identify useful patterns and trends. The RDA module 236 utilizes both clustering of the entity vectors and profile vectors to identify useful behavior patterns.

It should be noted that the adaptation of the entity vectors is not required for system operation. Indeed, when adaptation is enabled, it allows the entity vector of the product to "drift" toward users who have received the ad. In some applications, information content delivery systems in particular, this drift is not desirable. Clearly, the information content of a news story is deterministic and should not change based on who reads the story. As such, the present invention has provisions to disable the adaptation of entity vectors. However, in many applications, such as Internet advertising, the drift of the vectors is the mechanism whereby the system discovers patterns and trends.

In the preferred embodiment described herein, the software programs are written in the C, C++ and TCL programming language and run under the well-known UNIX operating system. C, C++, and TCL are industry standard programming languages for which many commercial compilers can be used to create executable code. However, the present invention may be run on a variety of conventional hardware and software platforms. The software system described herein may be distributed across different subsystems running on different hardware platforms. The components may communicate using messages transmitted using any network protocol, such as Transmission Control Protocol/Internet Protocol (TCP/IP) and RCP. The specific platform that hosts these modules and files is unimportant to the invention provided that the host computing environment has sufficient processing power. Additionally, each processing and/or data component may be hosted on a separate platform as long as paths of connectivity are provided via any sufficiently robust communication protocol.

The present invention includes six principle processing modules as follows: the word content vector learning module 200, the session compiler module 210, the real-time ad server module 214, the entity vector update server module 228, the profile vector update server module 224, and the relationship discovery and analysis module 236. Below, the aforementioned components are described in further detail.

Word Content Vector Learning Module

The word content vector learning module 200 (shown in FIG. 2) is implemented as an application programming interface. The application programming interface may be part of a computer program library. Advertisers use the procedures provided by this library to create a stand alone executable computer program capable of running on any platform of sufficient processing power. This program performs the content vector learning process which in one embodiment, is further described in the Caid patent. Additionally, this program writes the output of entity vector learning into data structures which are then utilized by the session compiler module 210 to create files optimized for runtime efficiency.

The training corpus 202 which includes a large number of documents containing unstructured text or symbols is selected and processed through the content vector learning algorithm. The resulting objects produced through the content vector learning process are then adapted for use by the other system components.

Figure 3:
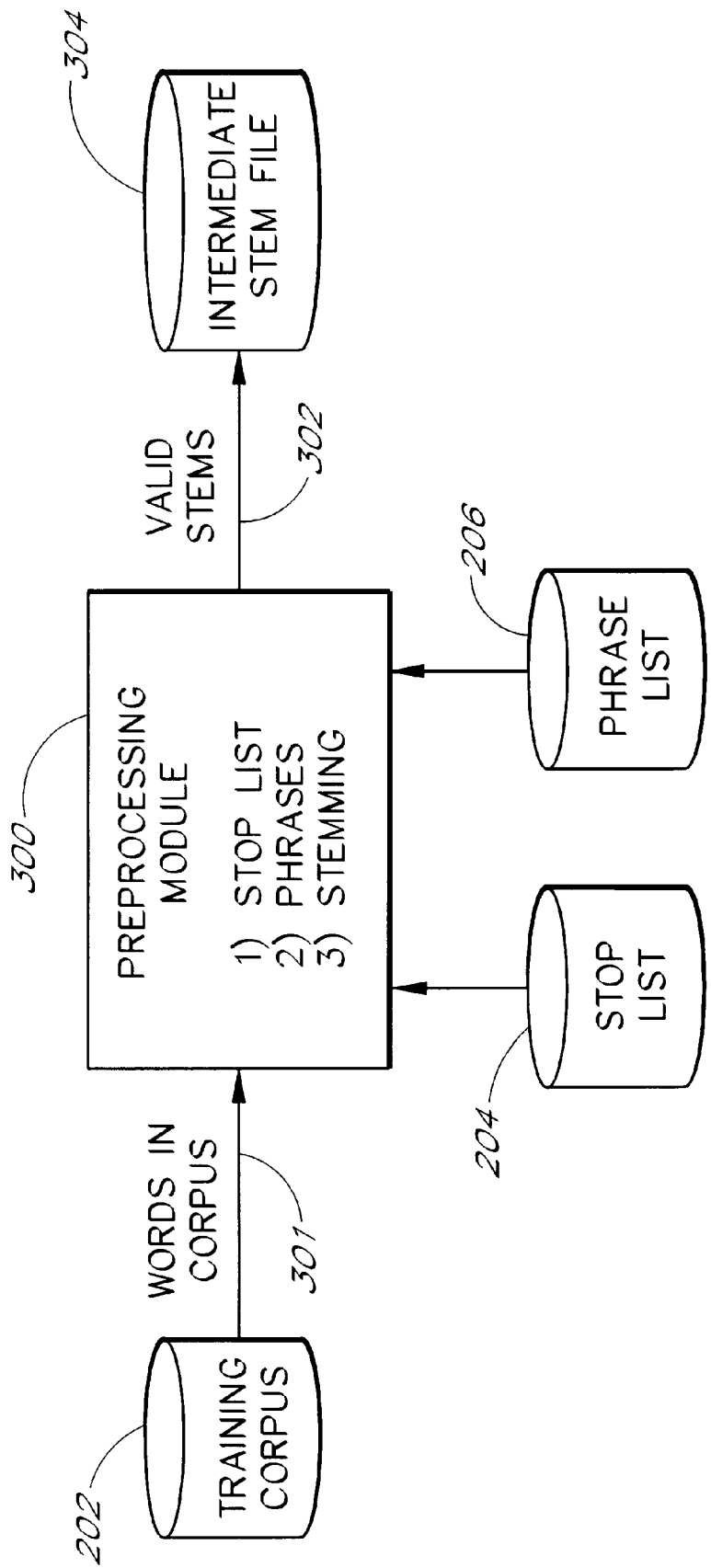
FIG. 3 is a block diagram illustrating the inputs and outputs of the preprocessing process of the word content vector learning module shown in FIG. 2.

FIG. 3 is a block diagram illustrating the inputs and outputs of a preprocessing module 300 of the word content learning module 200 shown in FIG. 2. As part of the pre-processing the word content vector learning performs the following functions:

1. Forms input.

Referring to FIG. 3, the requisite input files for the word content vector learning module 200 are assembled. The three input files are the training corpus 202, the stop list file 204 and the phrase list file 206.

In the situation where the symbols of interest are a series of words 301, the training corpus 202 includes a set of unstructured free form text documents that cover the domain of interest. For example, if the domain of interest is outdoor sports such as hunting or fishing, an appropriate training corpus might be 3 years of articles from Field and Stream magazine and the outdoor section of the local newspaper. This text is typically a "flat" ASCII format with any typesetting or formatting information removed.

The stop list file 204 (shown in FIGS. 2 and 3) is developed through a combination of human intellectual effort and conventional statistical techniques, that contains a list of words, word fragments and phrases for the word content vector learning module 200 to ignore. For the content vector word learning, as with conventional statistical information retrieval techniques, many words are meaningless. For instance, "AND", "NOT", "BUT", and "THE" are words that convey little meaning in terms of determining the thematic content of a set of text. As a consequence, these terms should be ignored. The stop list file 204 is a flat ASCII file that contains an exhaustive and enumerated list of words to ignore with one entry per line. The typical length of this file for conventional applications is approximately 250–350 of the statistically most frequently occurring words in the training corpus 202.

The phrase list file 206 (shown in FIGS. 2 and 3) contains the list of word sequences that are to be treated as a single symbol. Using this file, the word content vector learning module 200 treats certain phrases as single symbols. For instance, "San Diego" should be considered as a single symbol. The contents of the phrase list 206 are determined through intellectual effort, statistical techniques, linguistic processing or any combination thereof. The phrase list file 206 is not required for correct operation of the word content vector learning module 200, but the use of a meaningful phrase list does improve system performance. The phrase list 206 is a flat ASCII file with one phrase per line in the file.

2. Performs word content vector learning.

Once the training corpus 202, stop list file 204 and phase list file 206 have been assembled, the word content vector learning process is performed. The Caid patent provides a full disclosure on this approach, but a summary of the key steps are repeated here for convenience.

Referring to FIG. 3, the preprocessing is performed by a preprocessing module 300 which is part of the word content vector learning module 200. The preprocessing module 300 reads the training corpus 202, determines if the current word is on the phrase list file 206 or the stop list file 204, performs the stemming of the word, and writes a resulting valid stem 302 to an intermediate stem file 304 (shown in FIG. 3). The stemming process removes common suffixes from each of the words in the training corpus 202.

Figure 4:
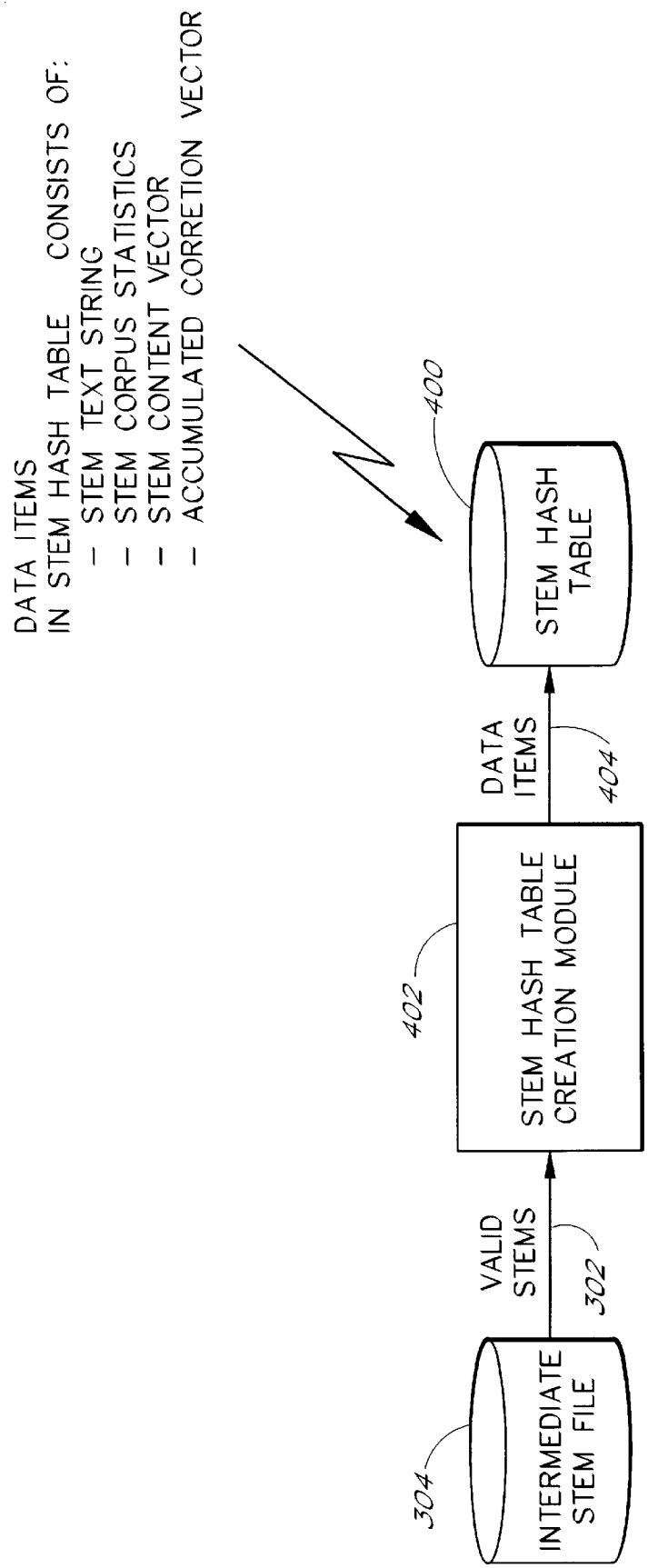
FIG. 4 is a block diagram illustrating the inputs and outputs of the hash table creation process of the word content vector learning module shown in FIG. 2.

FIG. 4 is a block diagram illustrating the inputs and outputs of the process for creating a stem hash table 400. The stem hash table 400 is created by a stem hash table creation module 402. The stem hash table creation module 402 is a sub-component of the word content vector learning module 200. For all of the stems 302 in the intermediate file 304, data items 404 are made in a stem hash table 400. This hash table also contains pointers for each stem to a unique data element that consists of a stem text string, stem statistics, a stem content vector, and a correction content vector that is used as temporary storage to accumulate the change vector to be applied to the stem content vector as part of the learning process.

Figure 5:
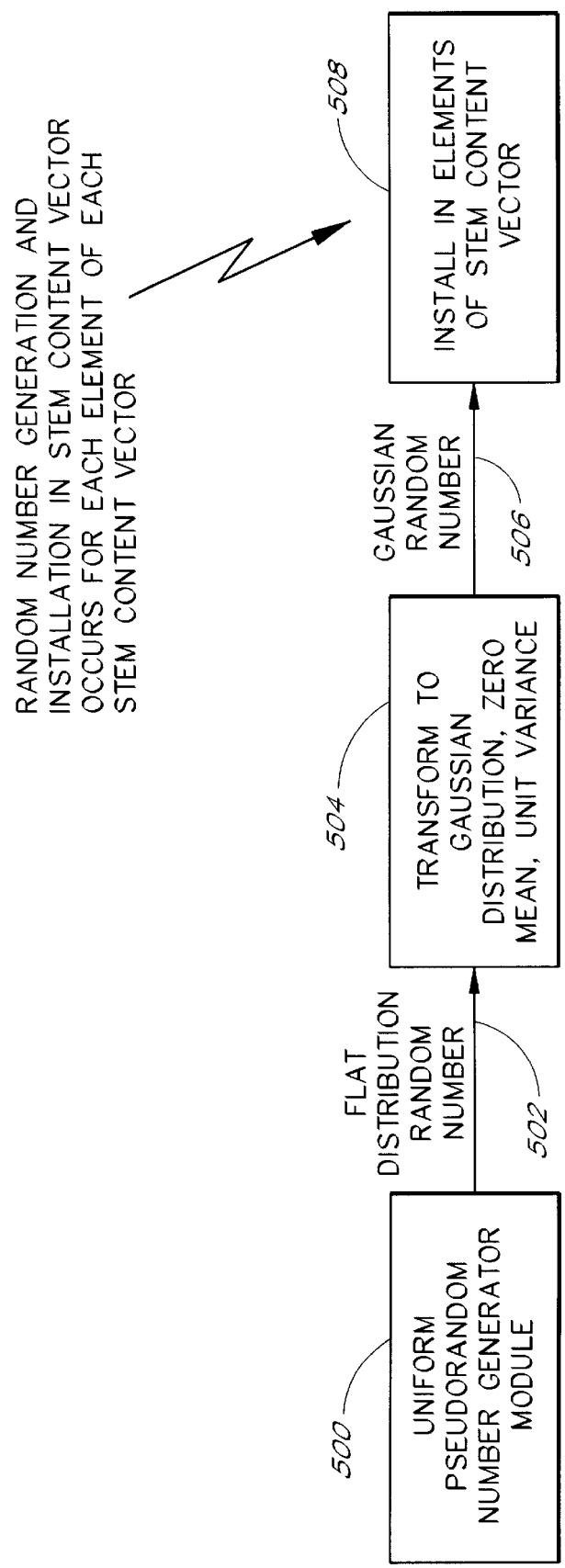
FIG. 5 is a block diagram illustrating the functions of the stem generating process of the word content vector learning module shown in FIG. 2.

FIG. 5 is a block diagram illustrating the random number generating process for creating initial conditions for the stem vectors. The initial conditions for each stem data item in the stem hash table 400 is created by a uniform pseudorandom number generator (UPNG) module 500. The UPNG module 500 generates an initial random content vector and stores this vector in the stem content vector. The UPNG module 500 generates initial conditions for stem vectors through the use of a long period pseudorandom number generator which creates a flat distribution random number 502. Any random number generator can be used assuming the period of repetition is sufficiently long (more than 100,000,000 cycles). Using the flat distribution random number 502, a transformer module 504, creates a Gaussian random variate 506 that has the property of zero mean and unit variance. An installation module 508 assigns the first Gaussian random variate to the first element of the current stem content vector. A second random variate is then assigned to the second element of the stem content vector. This process of assigning unique Gaussian distributed random numbers is repeated until all elements of all stem content vectors of all the stems in the stem hash table 400 have been populated.

Figure 6:
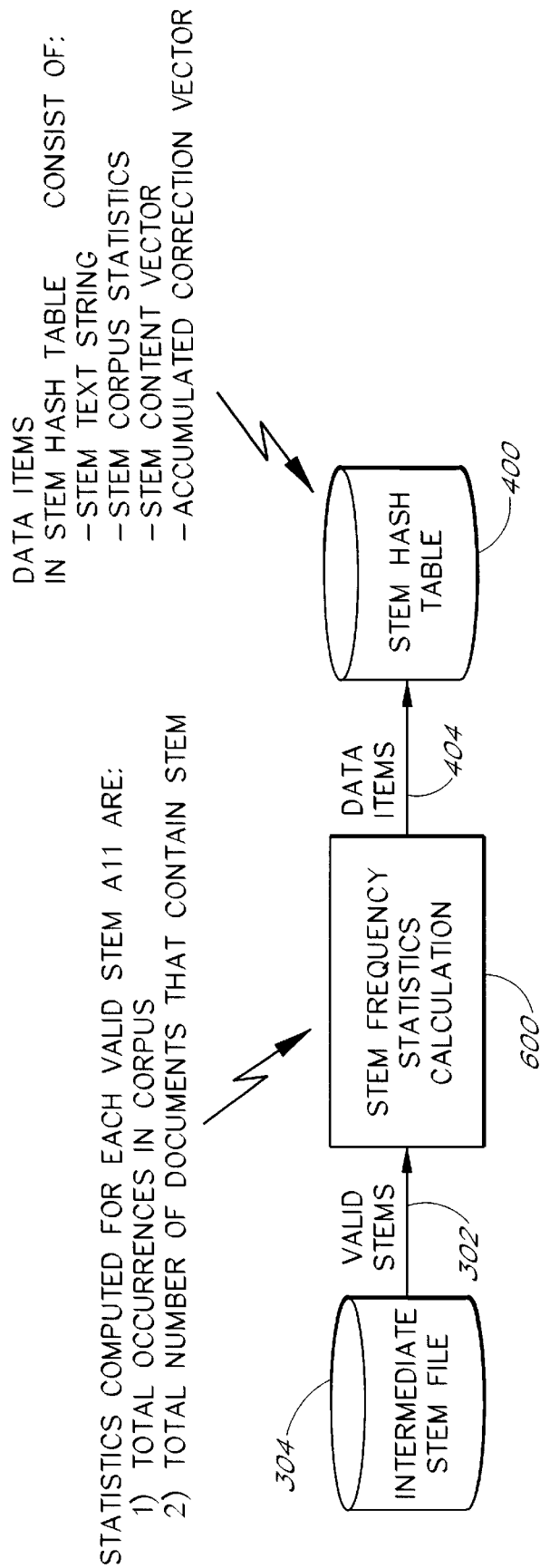
FIG. 6 is a block diagram illustrating the stem frequency statistics calculation process of the word content vector learning module shown in FIG. 2.

FIG. 6 is a block diagram illustrating the stem frequency statistics calculation process of the content vector learning module shown in FIG. 2. A processing module 600 acquires the stem frequency statistics from the intermediate stem file 304. The processing module 600 is a sub-component of the word content vector learning module 200. The processing module 600 reads the intermediate stem file 304 and computes the number of occurrences of each stem 302 in each document in the intermediate stem file 304. The processing module 600 then stores these statistics in the stem statistic section of each data item 404 in the stem hash table 400.

Figure 7:
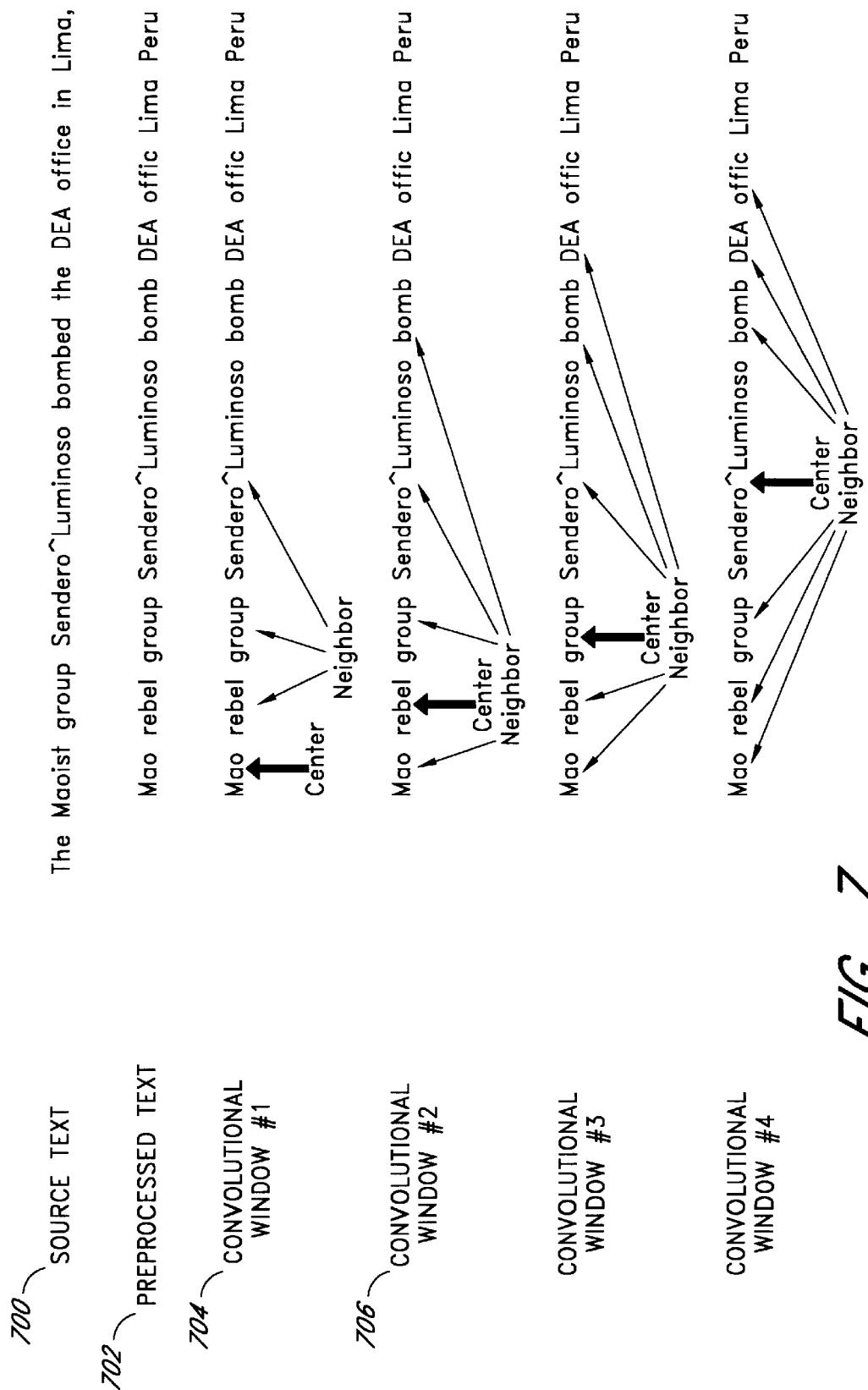
FIG. 7 is a diagram illustrating the different learning convolutional windows of the word content vector learning module shown in FIG. 2.

FIG. 7 is a diagram of the different learning convolutional windows of the entity selection system shown in FIG. 2. A series of corrections to the initial conditions of the stem content vectors based on word co-occurrences are computed for each of the stem content vectors in the stem hash table 400. The present system modifies the stem content vectors based on the words that co-occur with a stem using a convolutional co-occurrence window. FIG. 7 shows an initial source text 700. After some preprocessing, the source text 700 is transformed into the preprocessed text 702. The system creates a convolutional window 704 to analyze a center stem and the center stem's neighbors. The window has a center and up to three words on either side of the center, thus providing seven total words in the window. As can be seen in FIG. 7, the center of the window 704 is at the front of the document. As such, the window is one-sided. The correction vector for the window 704, centered on the stem "mao", consists of a vector function of the initial condition content vectors for "rebel", "group", and the phrase "Sendero Luminoso." The correction vector for a window 706, centered on stem "rebel", consists of a vector function of the initial condition content vectors for "mao", "group", "Sendero Luminoso" and "bomb." The window is moved one stem at a time and this process is continued for each stem in the preprocessed text 702. At each update position, a correction vector is calculated and summed into an accumulated correction vector located in the data items 404 of the stem hash table 400 (shown in FIG. 4).

Figure 8:
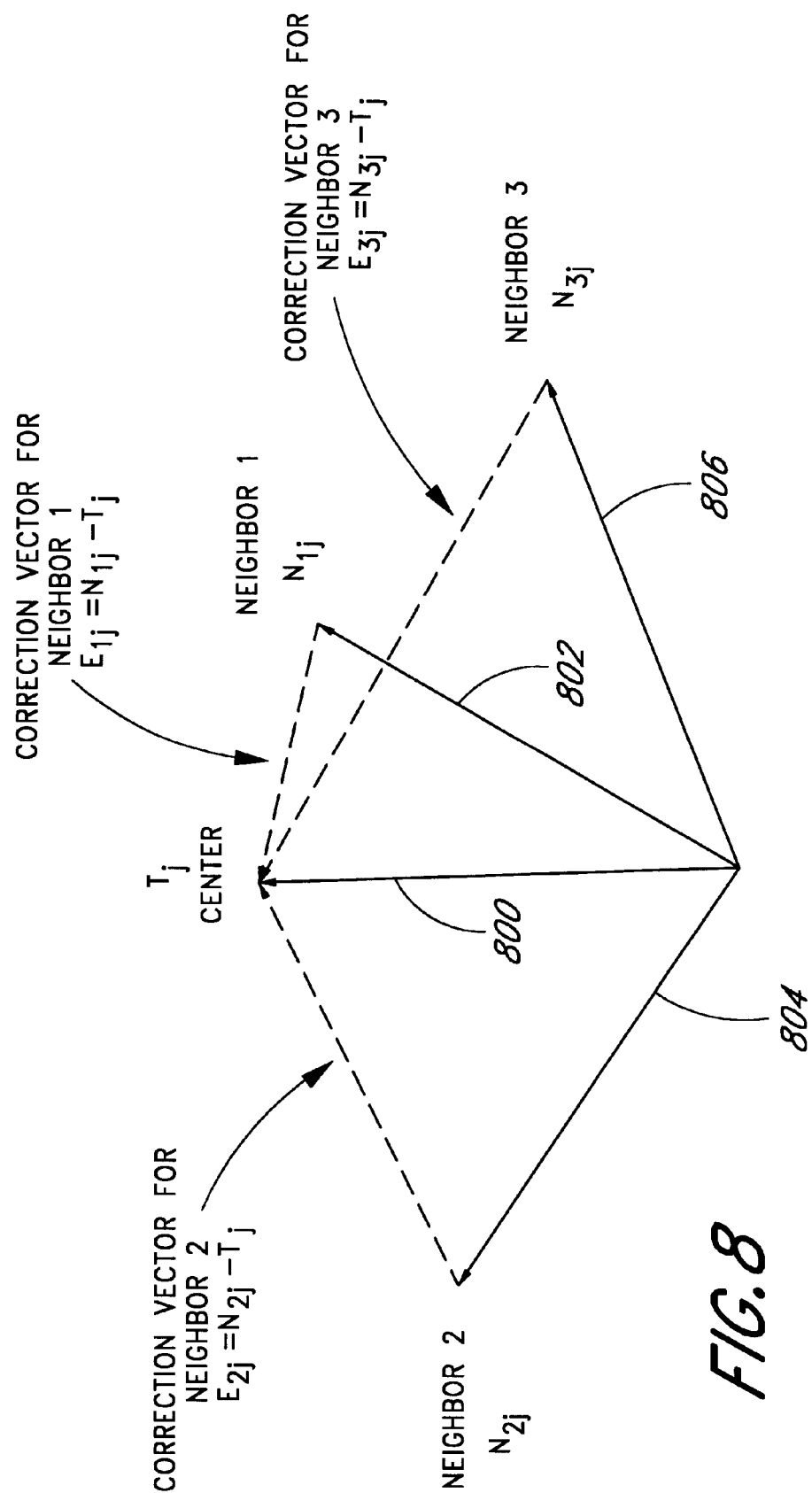
FIG. 8 is a diagram illustrating the vector manipulation process for adapting a stem vector by the vector of neighboring stems for a convolutional window shown in FIG. 7.

FIG. 8 is a diagram illustrating a manipulation process for calculating a stem vector by the vectors of its neighboring stems. Each stem in the stem hash table 400 is modified by the vector of its neighboring stems. For each convolutional window, a vector 800 associated with the center stem is adapted by a vector 802, 804, and 806 which are associated with the stems of the center stem's closest neighbors.

The following equations 1–4 provide the method for calculating the correction for each word in the convolutional window shown in FIG. 7.

$$E_{ij} = N_{ij} - T_j \tag{1}$$

The value $E_{ij}$ represents the error or correction between the current target (center) $T_j$ and neighbor $N_{ij}$. A correction for $T_j$ taking into account all current neighbors in window position is shown by equations 2 and 3.

$$C_j^{CURRENT} = \sum_i^{WS} (\|E_{ij}\| - \alpha_{ij}) \hat{E}_{ij} \tag{2}$$

$$C_j^{CURRENT} = C_j^{ACCUMULATED} + C_j^{CURRENT} \tag{3}$$

The variables shown in equations 2 and 3 are defined as follows:
(i) i=summation dummy variable;
(ii) $C_j^{CURRENT}$=correction vector for stem j;
(iii) $C_j^{ACCUMULATED}$=running summed correction for stem j stored in stem hash table data elements;
(iv) WS=window size in stems; and
(v) $\alpha_{ij}$=a proximity constraint that limits the correcting effect according to the statistics of stem i and j where $\alpha_{ij} = 1 - \Theta_i \Theta_j$.

$$\Theta_i = B + (1 - B)\left(1 - \frac{\log\left(\frac{1}{ND_i}\right)}{\log\left(\frac{1}{TND}\right)}\right) \tag{4}$$

Equation 4 is used to calculate the variable $\alpha_{ij}$ for equation 3. The variables shown in equation 4 are defined as follows:
(i) $\Theta_i$=statistical importance of stem i in the training corpus;
(ii) B=bounds control parameter determined empirically;
(iii) $ND_i$=number of documents that contain stem i; and
(iv) TND=total number of documents in the training corpus.

Equations 5–9 included below provide a final update to the vectors. It should be noted that the algorithm described in the Caid patent utilizes a batched update process. As such, the algorithm accumulates corrections to the target (center) stem content vector. These corrections are made only at the end of a pass through the training corpus 202. Typically, only two passes are required to achieve excellent learning results. The equations 1–4 are applied for each window position and the results are accumulated. At the end of each pass through all the stems in the intermediate stem file 304, the equations 5–9 are applied. The algorithm disclosed in the equations 5–9 computes the mean stem content vector, subtracts this from each normalized stem content vector and then re-normalizes the entire set of stem content vectors. This computation prevents the stem content vectors from being localized to only one region of the hypersphere and promotes better utilization of the vector space.

$$T_j^{NEW} = T_j^{OLD} + \frac{\gamma}{F_j} C_i^{ACCUMULATED} \tag{5}$$

$$T_j^{NEW} = \frac{T_j^{NEW}}{\|T_j^{NEW}\|} \tag{6}$$

$$M = \frac{1}{NSTEMS} \sum_i^{NSTEMS} T_i^{NEW} \tag{7}$$

$$T_j^{NEW} = T_j^{NEW} - M \tag{8}$$

$$T_j^{NEW} = \frac{T_j^{NEW}}{\|T_j^{NEW}\|} \tag{9}$$

The variables used in the equations 5 through 9 are defined as follows:
(i) $T_j^{OLD}$=old target content vector (initial condition or previous pass);
(ii) $T_j^{NEW}$=updated target content vector for current pass;
(iii) $\gamma$=learning rate;
(iv) $F_j$=total number of instances of stem j in the training corpus;
(v) $C_i^{ACCUMULATED}$=accumulated correction vector for stem i for this pass;
(vi) M=mean stem vector; and
(vii) NSTEMS=total number of unique stems in the trig corpus.

3. Writes output file.

Once the training is complete, the resulting stem content vectors are written to the word vector database 208.

Session Compiler Module

Figure 9:
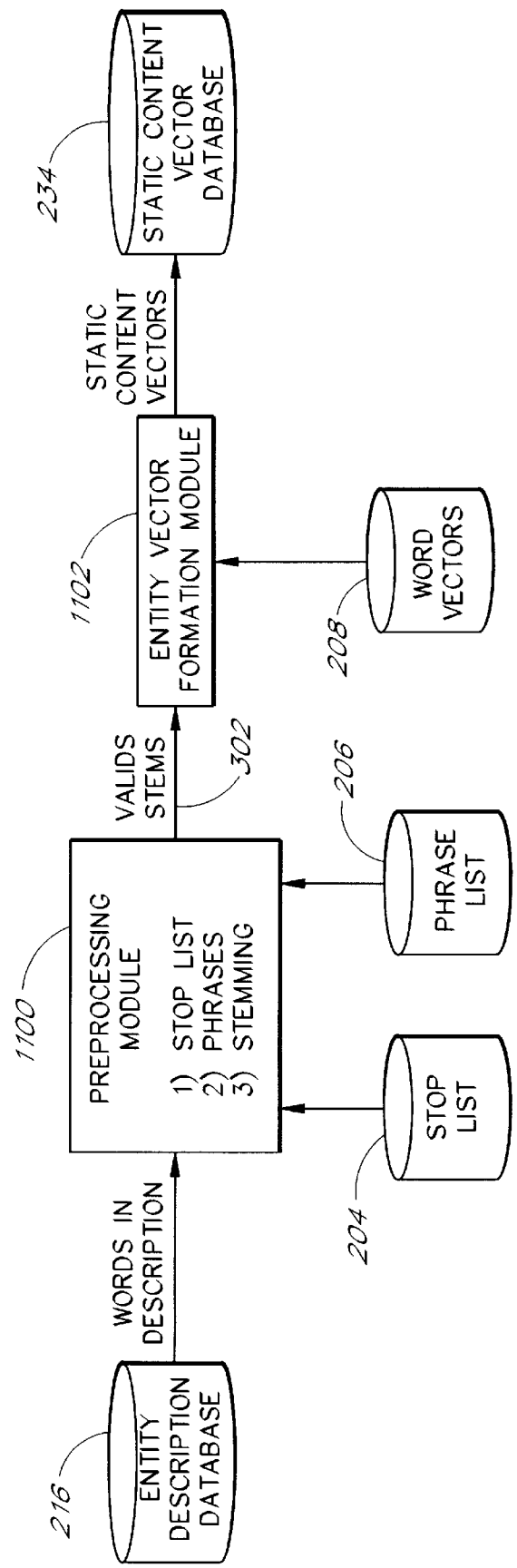
FIG. 9 is a block diagram illustrating the inputs and outputs of the entity vector creation process of the session compiler shown in FIG. 2.

FIG. 9 is a block diagram illustrating the inputs and outputs of the entity vector creation process of the session compiler module 210. In the present invention, the session compiler module 210 performs three functions: text to entity vector transformations, file format conversions, and session control file generation. Each of these functions is described below.

1. Text to entity vector transformations.

To enable the selection of data or information, a text to entity vector representation transformation is required to generate the entity vectors. FIG. 9 illustrates the processing performed by the session compiler module 210 when it converts textual information into an entity vector. A preprocessing module 1100 reads the entity descriptions from the entity description database 216. The preprocessing module 1100 is a sub-component of the session compiler module 210 shown in FIG. 2. The preprocessing module 1100 module is similar to the preprocessing performed as part of the preprocessing module 300 shown in FIG. 3. The preprocessing module 1100 determines if the current word read from the entity descriptions database 216 is on the stop list file 204 or on the phrase list file 206. The valid stems 302 are then used by an entity vector formation module 1102 to generate static entity vectors which are then stored in the static content vector database 234.

Equation 10 is an example of the process performed by the session compiler module 210 shown in FIG. 2 to form entity vectors. The content vector for an entity is the normalized weighted sum of the symbols that comprise that entity. For those entities that are textual descriptions, the description vector is the normalized weighted sum of the stem content vectors of the stems in the description.

$$ECV_i = \frac{\sum_j^{NSTEMS_i} \log\left(\frac{TND}{ND_j}\right) SCV_j}{\left\| \sum_j^{NSTEMS_i} \log\left(\frac{TND}{ND_j}\right) SCV_j \right\|} \quad (10)$$

The variables in equation 10 are defined:
(i) $ECV_i$=the entity content vector for entity i;
(ii) $SCV_j$=the stem content vector for stem j;
(iii) $TND$=the total number of documents in the training corpus;
(iv) $ND_j$=the number of documents in the training corpus that contain stem j; and
(v) $NSTEMS_i$=the number of stems in the description of entity i.

2. File format conversions.

Figure 10A:
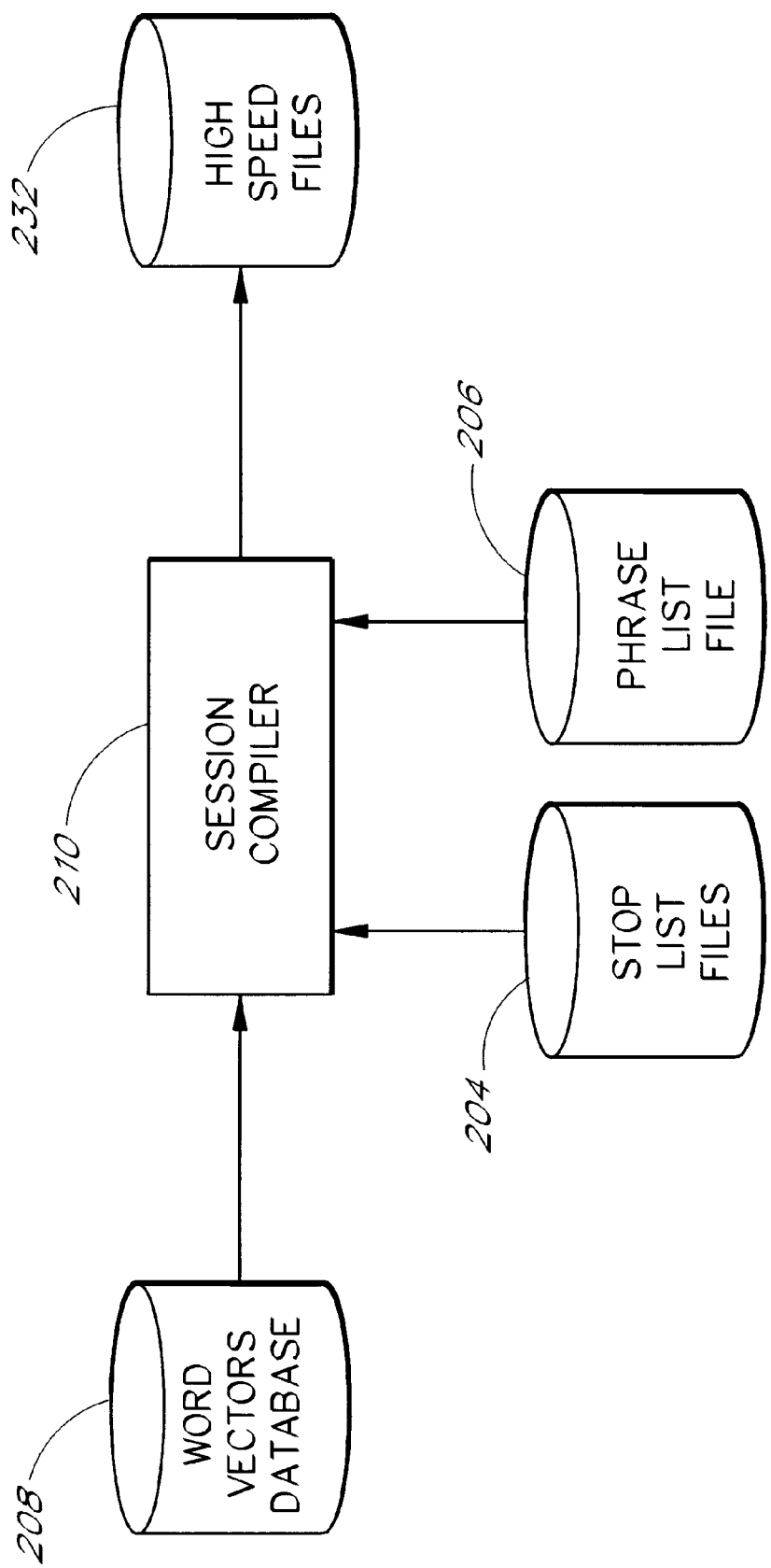
FIG. 10a is a block diagram illustrating the inputs and outputs of the process for creating the high speed files shown in FIG. 2.

FIG. 10a is a block diagram illustrating the process for creating the high speed files 232 shown in FIG. 2. The session compiler module 210 performs the file format conversions to facilitate the entity selection process, since the data structure formats that are computationally efficient during word content vector learning are inappropriate for use by the RTAS module 214 during entity selection. The operational flexibility and complexity required for the word content vector learning process is not required by the RTAS module 214, so substantial simplifications are made. As part of this transformation, all of the stem content vectors are pre-scaled by their frequency of occurrence in the training corpus 202. The stem content vectors are scaled by the same factor shown in equation 10 without the final normalization step. Additionally, the low frequency stems (those that occur less than four times in the training corpus) are removed from the file. The remaining stems represent the statistically most significant portion of the overall stem population. The session compiler module 210 then writes the resulting truncated and pre-scaled stem content vectors to the high speed files 232.

3. Session control file generation.

Figure 10B:
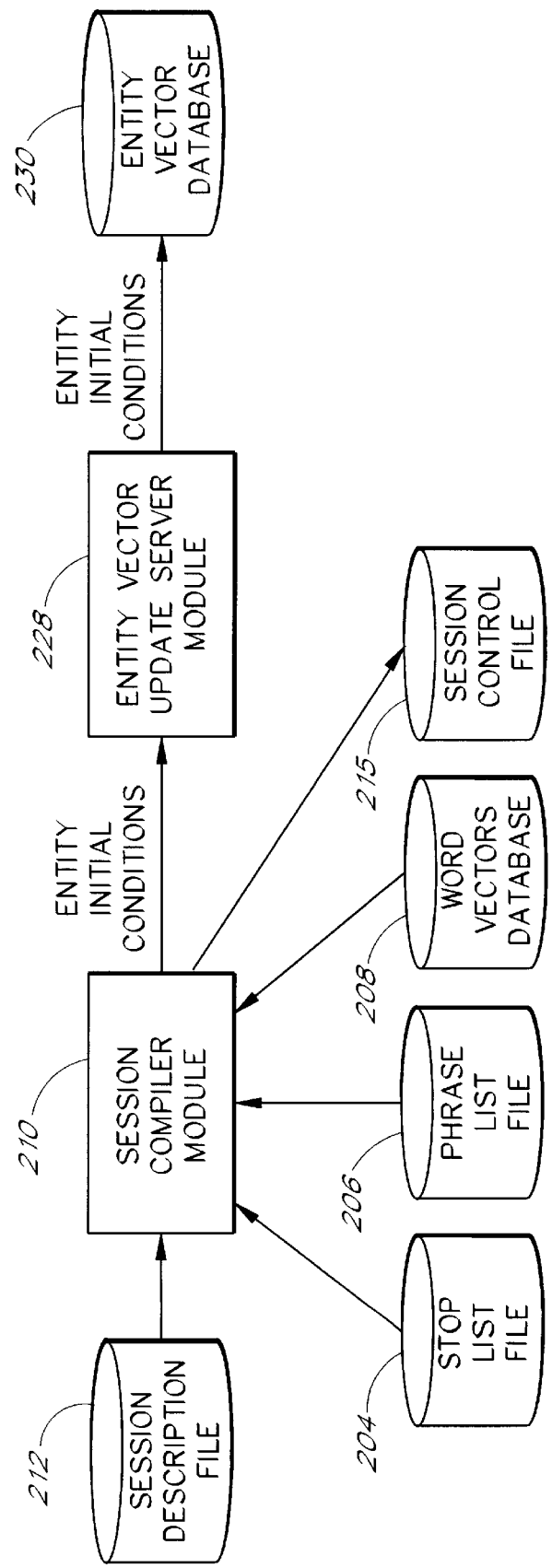
FIG. 10b is a block diagram illustrating the inputs and outputs of the process for generating the session control file shown in FIG. 2.

FIG. 10b is a block diagram illustrating the process for generating the session control file 215. The primary function of the session compiler module 210 is the generation of a session control file 215 from operator created session descriptions contained in the session description file 212. The session control file 215 contains the instructions in machine readable format to guide the RTAS module 214 during the ad selection process. The session control file 215 contains the information specified in the session description file 212 and a set of initial entity vectors. The session control file 215 has the ability to identify a group of ads eligible for selection and to provide a set of backup entity vectors in event the EVUS module 228 is not operational. The session information in the session description file 212 describes a set of entities, such as advertisements, that are eligible for selection to become active. The session control file 215 contains a control mechanism for the following attributes for each ad:

Static or dynamic attribute control. An ad is either statically set to a fixed location in the context vector space or allowed to dynamically adapt based upon user responses.

Reset. If reset functionality is specified, the entity vector for an existing ad is reset to its initial vector.

Targeted impression count. The targeted impression count determines the number of impressions that should be delivered for the ad.

Start date. The start date determines the date and time that the ad is to become eligible for selection.

End date. The end date determines the date and time that the ad is to become ineligible for selection.

Initial conditions. The advertiser can describe the initial entity vector selection for the ad. Options for the initial vector selection include:

(i) a vector based upon the ad and the aforementioned text to vector conversion process;

(ii) a vector based upon the entity vector of a specified ad; and (iii) a vector based upon an entity vector contained in an external file.

The session compiler module 210 also establishes a connection with the EVUS module 228 (shown in FIG. 2) which is the repository for all active entity information. The initial entity vectors are calculated for the ads and the ad identifiers, parameters, and vectors are transmitted to the EVUS module 225 for storage in the entity vector database 230.

Real Time Ad Server Module

The RTAS module 214 provides an Application Programming for Interface (API) local or remote software applications call to perform various ad management routines. The RTAS module 214 selects according to guidelines set in the session control file 215 an advertisement to be displayed to a user.

During the ad selection processing, the RTAS module 214 performs the processing steps listed below.

1. Initialization.

When the RTAS module 214 receives an initialization command, the RTAS module 214 reads the session control file 215 and initializes internal control tables stored in memory. The RTAS module 214 then requests the appropriate entity content vectors as specified by the contents of the session control file 215. The RTAS module 214 requests from the entity vector database 230 via the EVUS module 228 the entity vectors for the active entities and stores them in a memory resident data structure within the RTAS module 214. Once initialization is complete, the RTAS module 214 is ready for real-time operation.

2. Determination of user behavior vector.

When a user action message enters the system via the client API, the RTAS module 214 establishes the behavior vector for that user. If the user is already known to the system, the user id, provided by the user's web browser, is used as the key for a database retrieval. The RTAS module 214 passes the user ID to the PVUS module 224. The PVUS module 224 then returns the profile vector associated with that user from the profile vector database 226. If the user is unknown to the system, a new initialized vector is returned. In either case, the RTAS module 214 has a valid user behavior vector for subsequent operations. This vector is stored within internal memory tables within the RTAS module 214.

3. Observation of user behavior.

The RTAS module 214 also incorporates user behavior into the user's profile vector. These behaviors include a web page request 218 or a search query 217 as shown in FIG. 2. The client computer 219 passes a behavior packet including the observed behavior in the client API. The RTAS module 214 uses the information contained in the user behavior packet to generate a behavior vector for the user action.

Figure 11:
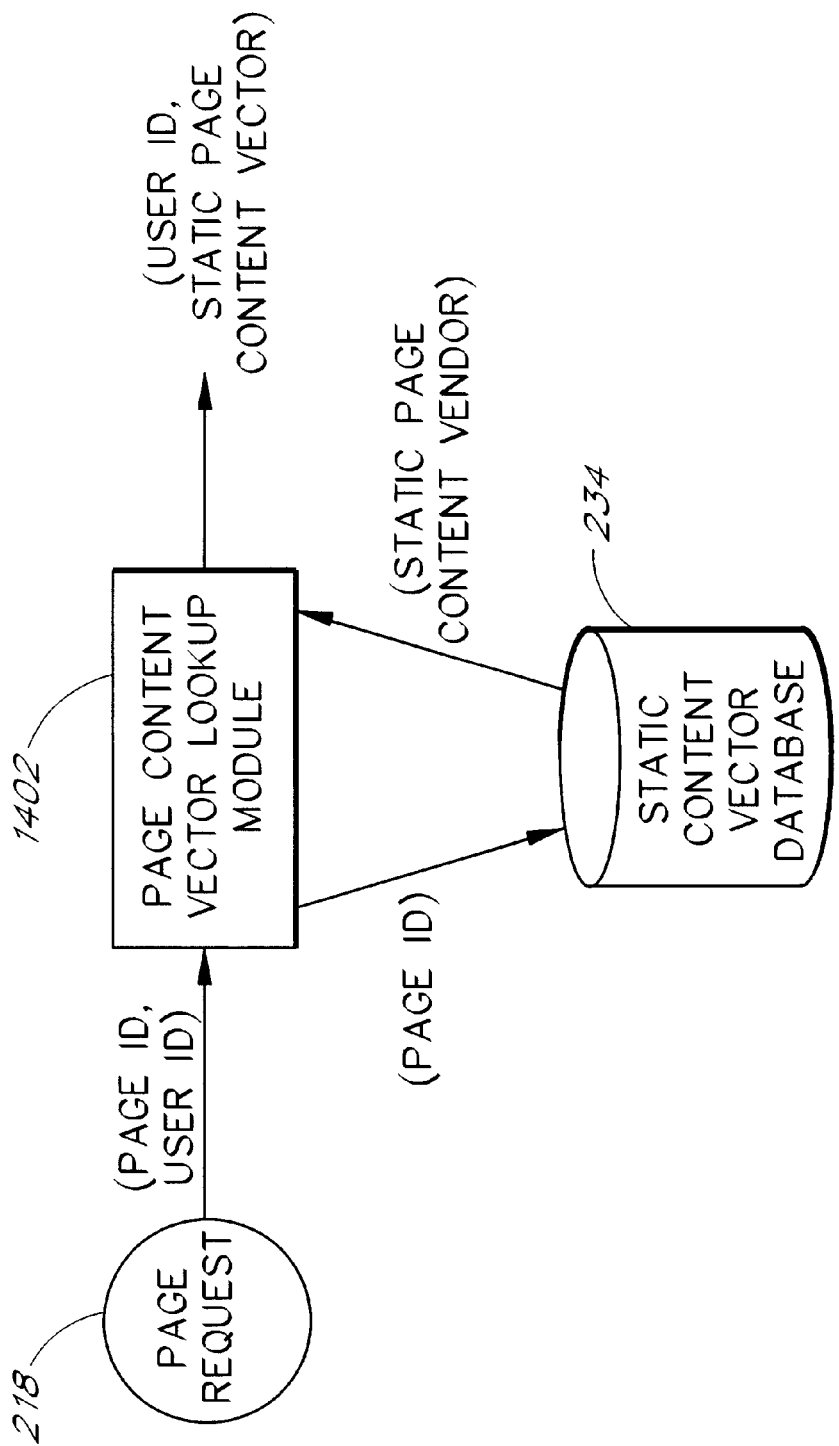
FIG. 11 is a block diagram illustrating the inputs and outputs of the process for transforming a page request into an content vector which is performed by the real time ad sever module shown in FIG. 2.

FIG. 11 is a block diagram illustrating the inputs and outputs of the process for transforming a page request into an content vector which is performed by the RTAS module 214 shown in FIG. 2. If the observed user behavior includes a page, navigation or hierarchy request 218, a page content vector lookup module 1402 which is part of the RTAS module 214 retrieves the entity vector associated with the ID of the requested page from the static content vector database 234. The RTAS module 214 augments the entity vector module of the user requested page with the user ID to provide a behavior vector.

Figure 12:
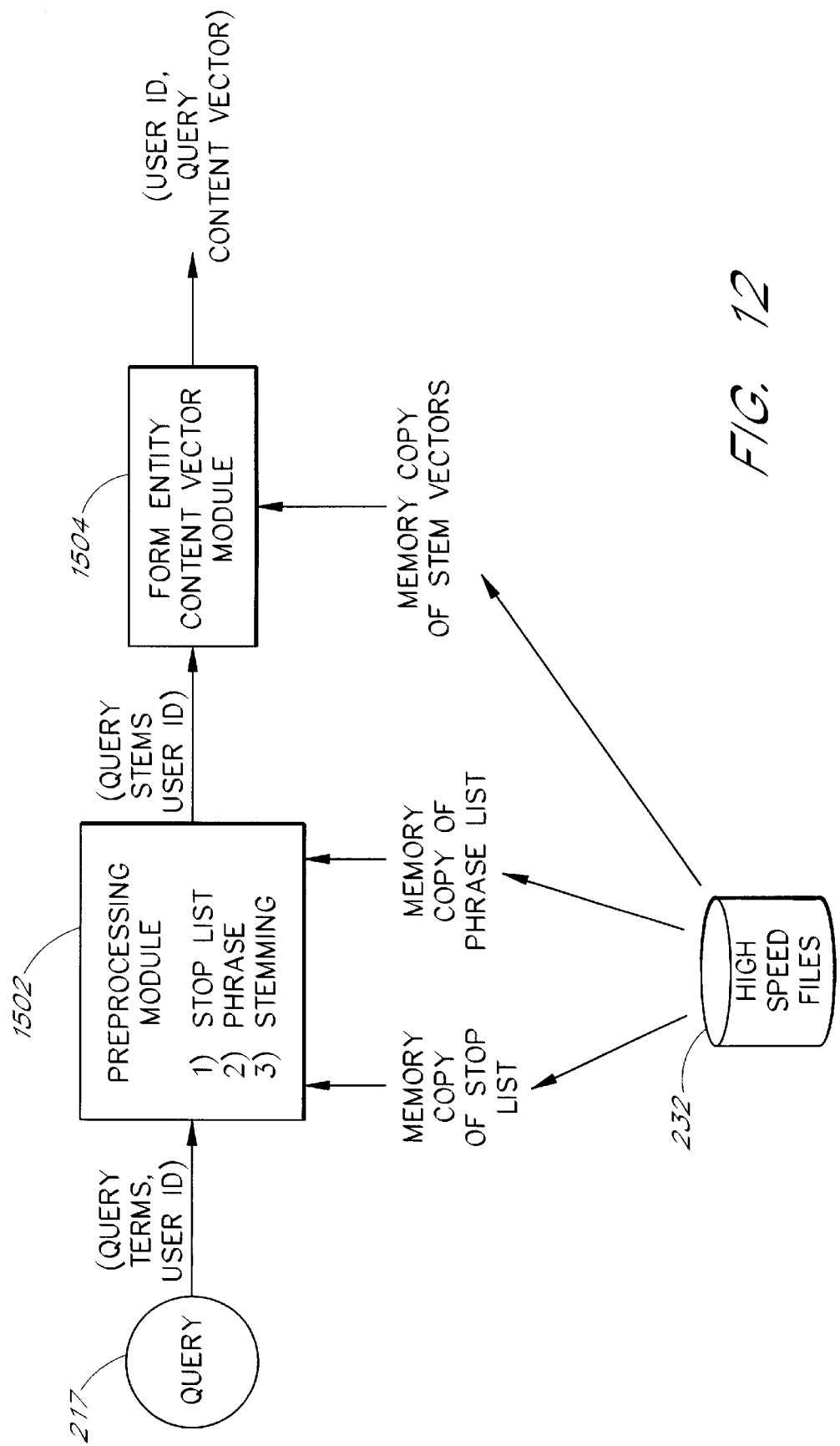
FIG. 12 is a block diagram illustrating the inputs and outputs of the process for transforming a query into a content vector which is performed by the real time ad server module shown in FIG. 2.

FIG. 12 is a block diagram illustrating the inputs and outputs of the process for transforming a query into a content vector which is performed by the real-time ad server module shown in FIG. 2. If a client computer 219 observes user behavior such as a user query 217, the RTAS module 214 transforms the query 217 into a content vector by using the memory image of the high speed file 232 to provide an entity vector based upon the query terms. A preprocessing module 1502 which is part of the RTAS module 214, removes common words that are identified in the stop list file 204, combines the words that are part of a phrase list file 206 and performs the stemming process for all of the terms in the user query 217. The RTAS module 214 then creates a user behavior vector by augmenting the result of the aforementioned query 217 with the user ID by a form entity content vector module 1504.

4. Selection of best entity to present.

Figure 13:
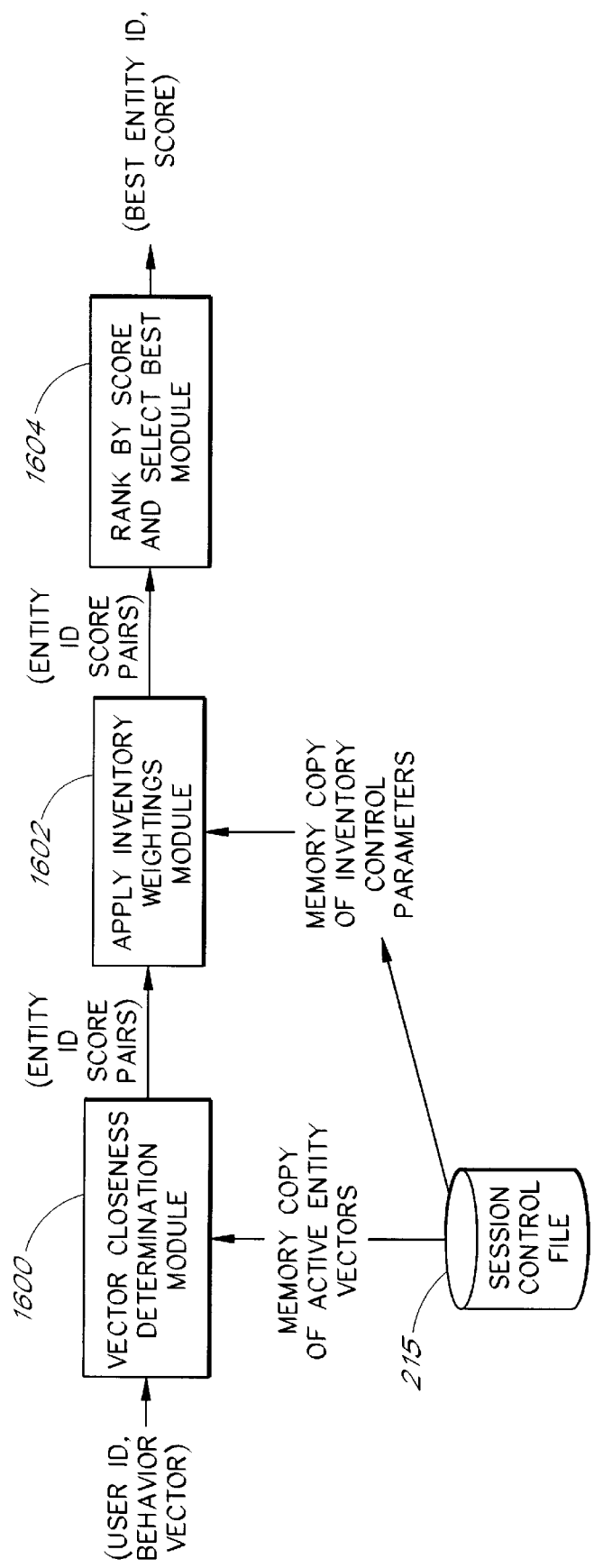
FIG. 13 is a block diagram illustrating the functions of the ad selection process performed by the real time ad server shown in FIG. 2.

FIG. 13 is a block diagram illustrating the functions of the ad selection process performed by the RTAS module 214 shown in FIG. 2. If the client computer 219 (shown in FIG. 2) does not observe user behavior, the RTAS module 214 uses historical user profile vector from the profile vector database 226 as the basis for selection of the best entity to present. If the client computer 219 observes interactive behavior, the RTAS module 214 uses the observed user behavior vector as the basis for selecting the best entity to present.

The RTAS module 214 uses the historical user profile vector or behavior vector as the basis of a vector comparison against all active ads as specified by the session control file 215. The contents of the session control files 215, which are loaded into memory by the RTAS module 214 during initialization, are available for high speed searches. By placing the session control files in memory of the RTAS module 214, a performance gain is realized.

Referring again to FIG. 13, the RTAS module 214 performs the optimum entity selection by performing dot products of entity vectors with behavior and user vectors (state 1600). The RTAS module 214 performs a search process by computing a vector closeness metric between the vector to be compared and all active ad vectors. Although the RTAS module 214 may use any vector proximity metric, the preferred embodiment of the invention uses a vector inner product.

At a state 1602, the RTAS module 214 selects the closest ad subject to inventory management constraints. Specifically, if the closest ad has already been presented sufficient times to the user population, the RTAS module 214 presents the second closest matching ad is selected. The inventory management scheme can be arbitrarily complex and the RTAS module 214 has provisions to interface to an external inventory management module, that may be used to adaptively balance ad presentations subject to a series of external constraints. An inventory weighting module which is a sub-component of the RTAS module 214 performs all of the inventory control operations by adjusting the vector closeness weights. The RTAS module 214 then measures and ranks each ad ID by score (state 1604).

Once the closest entity or ad has been selected, subject to the constraints described above, the RTAS module 214 passes the ID of the selected ad via the API to the client computer 219. The ID is used by the client computer 219 to retrieve and display the actual ad image to the user via the web.

To improve performance, the RTAS module 214 caches the set of entity vectors and parameters described by the active session control file 215. The RTAS module 214 obtains periodic updates from the EVUS module 228 for changed entities.

5. Observe user response to entity presentation.

Once the best entity or ad is determined and the host system generates a web page that incorporates the selected ad, the user response to the ad is monitored. If the user requests more information on the product, as indicated by clicking on the entity or ad, this event is sent via the API to the RTAS module 214. However, all ad presentations need not result in a message to the RTAS 214 module.

6. Update of user behavior vector.

The RTAS module 214 adapts the user behavior profile vector to reflect observed user actions. The observed user behavior vector is then used to update the profile vector for that user. The RTAS module 214 sends the user ID and observed user behavior vector to the PVUS module 224 for modification of the historical user profile vector. The operation of the PVUS module 224 is described below in greater detail.

7. Update of ad or entity vector.

Figure 17:
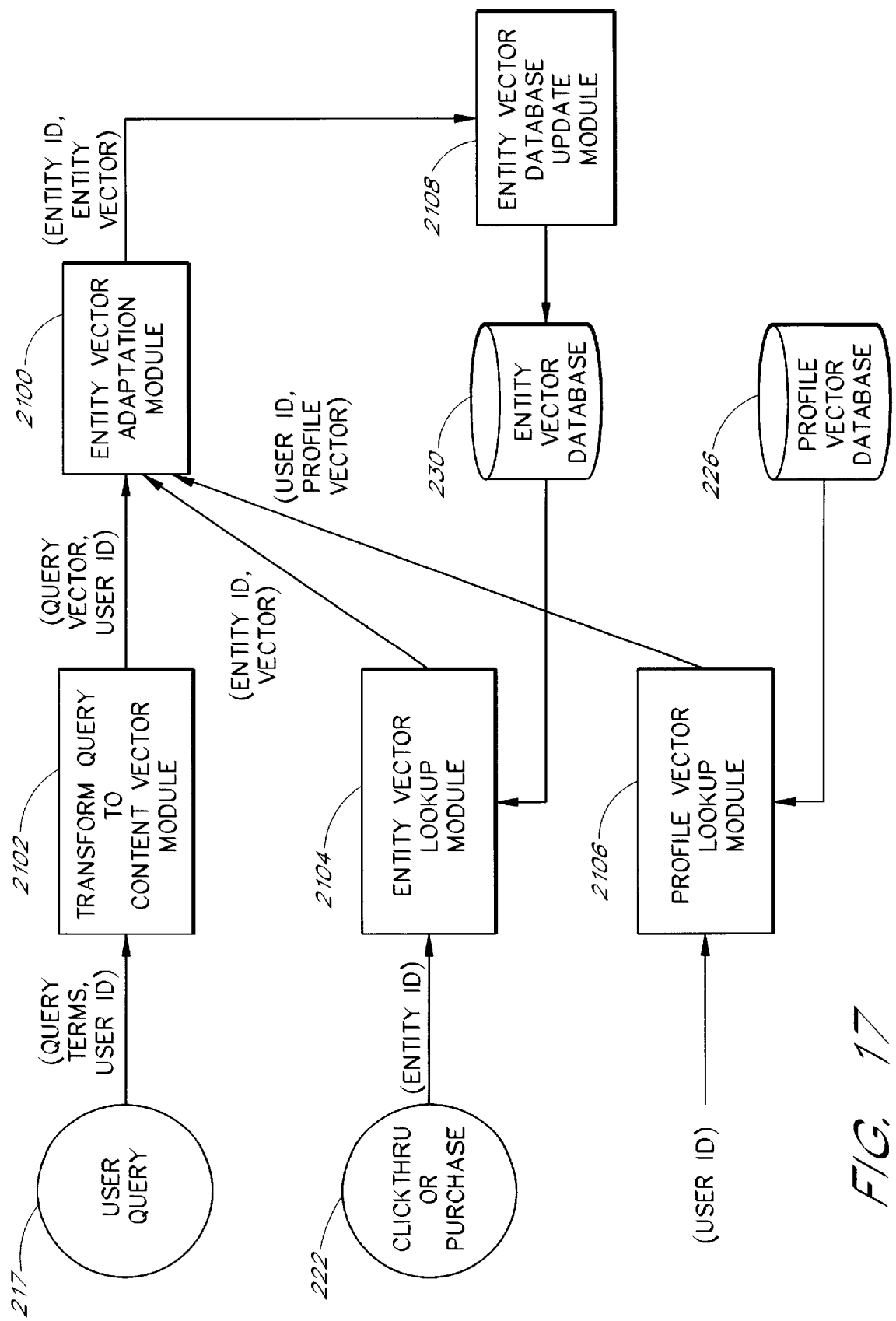
FIG. 17 is a block diagram illustrating the functions of the process by which the entity vector update server module shown in FIG. 2 adapts entity vectors.

If the user responds to the entity (ad, coupon or solicitation), the entity vector and user ID are sent to the EVUS module 228 for update (shown in FIG. 17). The EVUS module 228 then adapts the entity vector toward the observed behavior vector of the user. The operation of the EVUS module 228 is described below in greater detail.

Profile Vector Update Server Module

The PVUS module 224 is responsible for the storage, retrieval and updating of the user profile vectors that are contained in the profile vector database 224.

These user profile vectors are the basis for a wide range of processing capabilities including:

(i) dissemination of targeted advertising, coupons, offers and information to the user;

(ii) analysis of user behavior;

(iii) correlation of user behavior with advertising, product and service descriptions;

(iv) inference of user characteristics based on cross-correlation of user behavior profiles with demographic purchasing databases;

(v) tracking user behavior over time;

(vi) predictive modeling of likely user behavior and optimization of information presentation based on these predictive models; and (vii) accumulation of effectiveness and click-through statistics to optimize predictive models, provide management reports and lay groundwork for increased ad revenues.

In the preferred embodiment of the invention, the PVUS module 224 also incorporates external information, such as credit card purchasing histories into the user profiles. This information is easily incorporated, since the content vector representation accommodates the aggregation of heterogeneous symbolic information, such as web behavior and credit card purchases, into a unified high dimensional space.

The PVUS module 224 is implemented as one or more executable computer programs that receive requests from clients over a network protocol such as TCP/IP and generates responses to such requests. The PVUS module 224 has one or more physical databases which are used to store the user profile content vectors and parameters which are indexed by unique user IDs. Multiple PVUS modules may be in simultaneous operation to handle large numbers of users. When multiple servers are used, they are addressed by the clients as a single entity. The PVUS modules may be scaled across multiple hardware platforms to support a large user population. This distribution is accomplished by multiplexing the user ID to select one of N physical servers. Each server may further multiplex the request to one of M physical databases. Multiplexing is achieved by generating a hash code from the user ID which results in essentially random bit distributions in the hash code. There are many multiplexing hashing algorithms, that may be used. However, the preferred embodiment uses the MD5 algorithm. The multiplexor then uses a modulo N on the hash code to determine which of N children should handle the request.

The PVUS module 224 performs the processing actions listed below.

1. Creation of new user profile vectors.

Each user in the system is assigned a unique user ID. In the web environment this could be the user's Internet IP address or a host selected ID placed in the browser "cookie" file. If a request is made for a user ID that is not contained in the profile vector database 226, the PVUS module 224 creates an entry for the new user and initializes the new user profile vector to a pseudorandom content vector which will be later adjusted by the adaptation algorithm (shown in FIGS. 19a and 19b).

2. Retrieval of user profile vectors and parameters.

The PVUS module 224 obtains a user profile vector by using the unique user ID to determine a hash code. The entry in the hash table at that location contains a pointer to the information in the profile vector database 226. The PVUS module 224 uses the database pointer to perform the retrieval of the user profile vector. If the request for the profile vector is from the RTAS module 214, the PVUS module 226 passes the profile vector to the RTAS module 214 for subsequent use.

3. Adaptation of user profile vectors.

The PVUS module 224 performs the adaptation of the user profile vectors based upon some observation about a user's behavior. As the user traverses a web site utilizing the present invention, behaviors are observed including user requested queries, web pages and ads. Each observed behavior is converted into a content vector and is also used to adapt a user's profile vector which is stored in the profile vector database 226.

Figure 14:
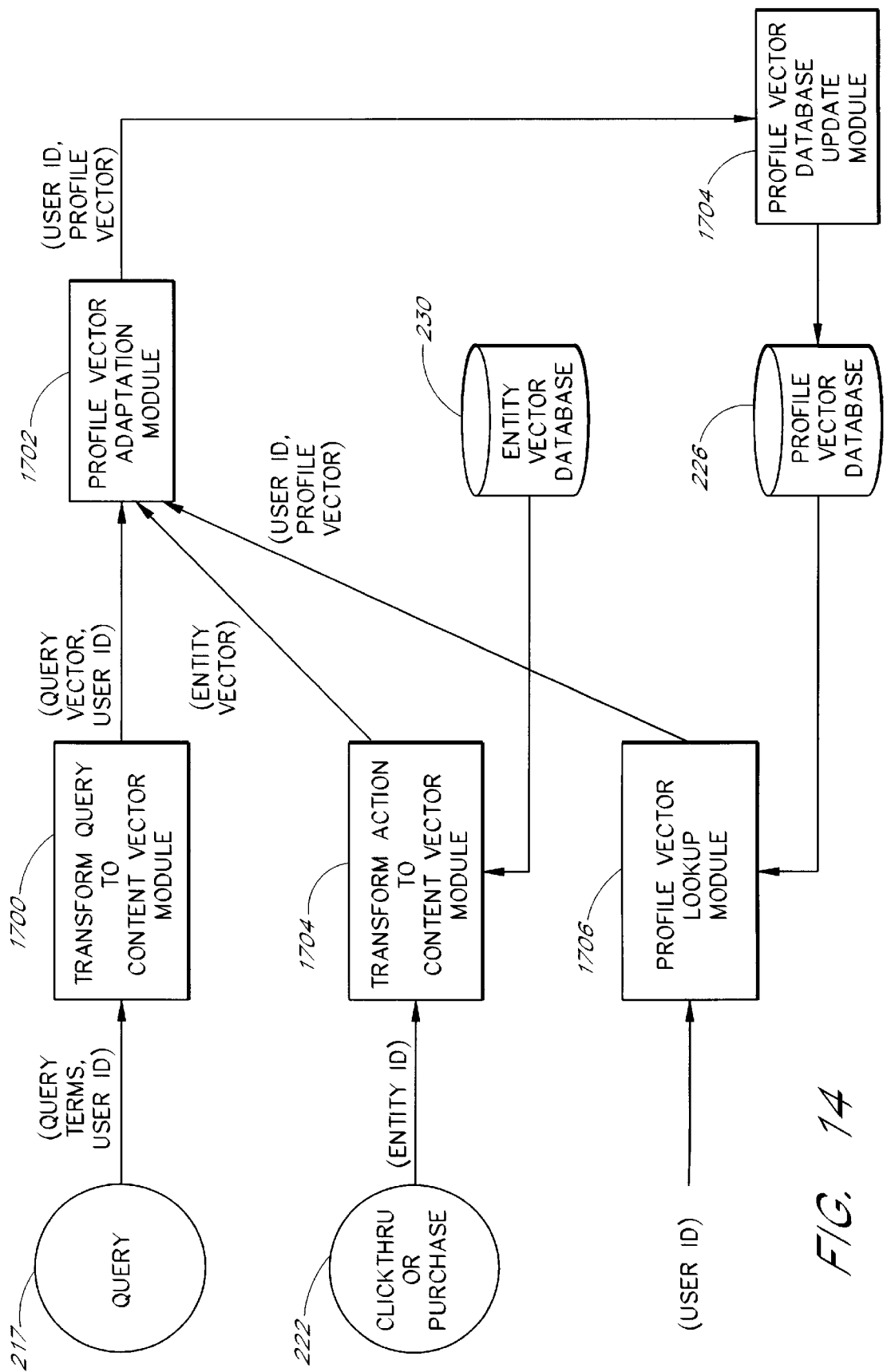
FIG. 14 is a block diagram illustrating the functions of the profile vector adaptation process of the profile vector update server shown in FIG. 2.

FIG. 14 is a block diagram illustrating the profile vector adaptation process of the PVUS module 224 shown in FIG. 2. The PVUS module 224 contains several subcomponents including a transform query to content vector (TQCV) module 1700, a transform action to content vector (TACV) module 1704, a profile vector lookup (PVL) module 1706, and a profile vector adaptation (PVA) module 1702. If the user enters a query 217 to the system, the query string and the user ID are passed to a TQCV module 1700. The TQCV module 1700 transforms the query string into a query content vector in the same manner as the process shown in FIG. 10b. The resulting query content vector is passed to the PVA module 1702 for adaptation of the user profile vector. The PVA module 1702 utilizes the adaptation algorithm described below and shown in FIGS. 19a and 19b. A profile vector database update module 1704 writes the updated profile vector is to the profile vector database 226 for later use.

If the user clicks on an ad or purchases a product 222, the TACV module 1704 uses the ad or product description to adapt the user profile vector. This module 1704 transforms the entity ID into a content vector via a table lookup in memory within the PVUS module 224. In parallel, the user ID is used to lookup the user profile vector from the profile vector database 226. The PVA module 1702 inputs these two vectors into the adaptation algorithm described in FIGS. 19a and 19b. The profile vector database update module 1704 then writes updated profile vector to the profile vector database 226 for later use.

4. Demographic predictions and tagging.

For many advertising and sales applications, it is advantageous to have an estimate of the demographic parameters for individuals as well as the entire user population. In the present system, although no user registration is performed, advertisers can analyze the profiles vectors to retrieve user demographics. Advertisers can use these profile vectors to estimate the age, gender, household income (HHI), and other demographic parameters of a user. The present system has provisions to incorporate demographic models into its operation. When using these demographic models, the demographic parameters of the entire population of users are estimated and used to augment the information in the profile vector database 226. This estimate process can be performed by both conventional statistical methods or via neural network techniques.

Figure 15:
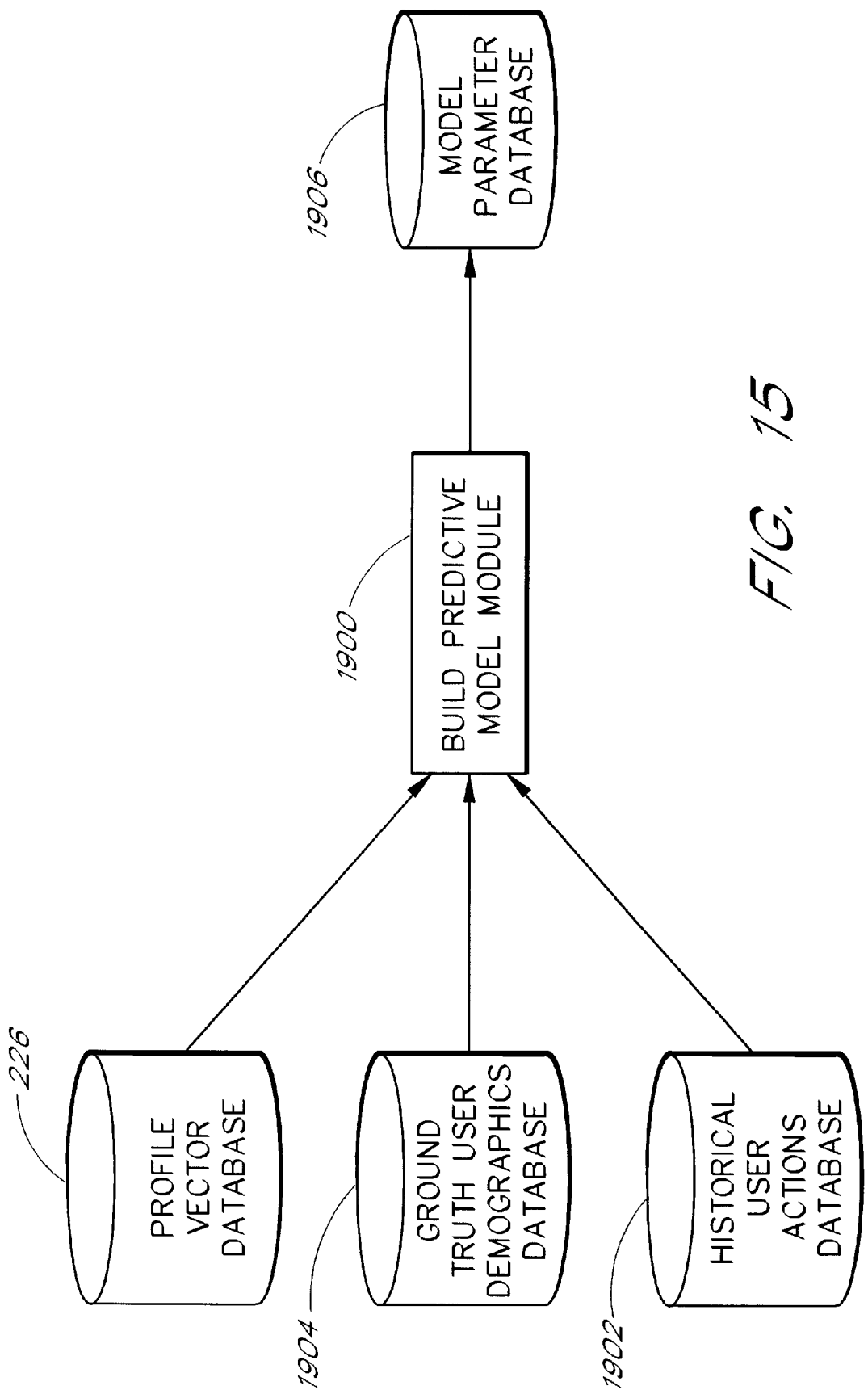
FIG. 15 is a block diagram illustrating the inputs and the outputs of the model building process performed by the relationship, discovery and analysis module shown in FIG. 2.

FIG. 15 is a block diagram illustrating the inputs and the outputs of the model building process performed by the relationship, discovery and analysis module shown in FIG. 2. Predictive models for the estimation of age, gender and HHI are constructed using a combination of previous observed behavior contained in a historical user actions database 226, ground truth information from user registration on a different service or via a ground truth user demographics database 1904, and profile vectors from the profile vector database 226. Using this information, a modeling module 1900 constructs a set of model parameters. These model parameters are stored in a model parameter database 1906. Any statistically valid process can be used in the modeling module 1900, including neural network techniques, to derive the predictive model parameters. The typical outputs of the predictive model are age, gender and HHI.

Figure 16:
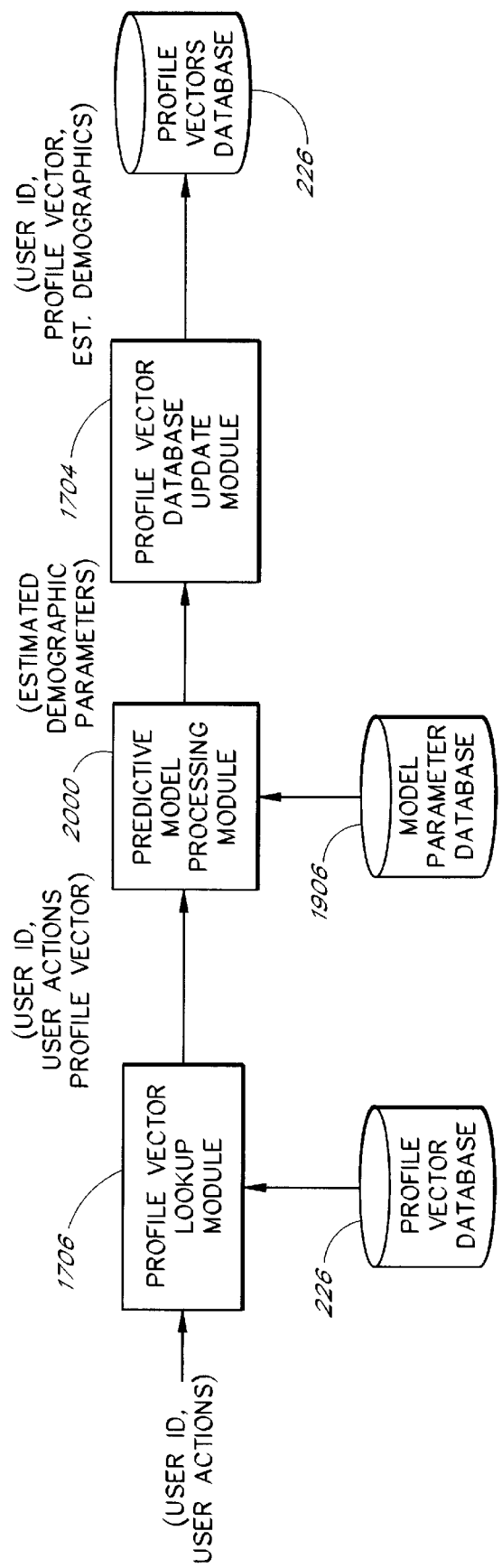
FIG. 16 is a block diagram illustrating the functions of the process by which the profile vector update server module shown in FIG. 2 updates the profile vector database with demographic information.

FIG. 16 is a block diagram illustrating the process by which the PVUS module 224 updates the profile vector database 226 with demographic information. For each user in the profile vector database, the PVL module 1706 retrieves the user's associated profile vector from the profile vector database 226. The PVL module 1706 passes this information, with the user ID and historical actions to a predictive model processing module 2000. The predictive model processing module 2000 uses the model parameters from a model parameter database 1906 in conjunction with the current user profile vector and previous observed behavior to form an estimate of a set of demographic parameters for the current user. This estimate is added to the information contained in the profile vector database 226 by a profile vector update module 1704. The augmented contents are used as input to the RTAS module 214 during ad selection and as part of the relationship discovery and analysis process.

Entity Vector Update Server Module

The EVUS module 228 is responsible for the storage, retrieval and updating of the entity profile vectors from the entity vector database 230. The EVUS module 228 is the main processing module in the system to read and to write the entity vector database 230.

The EVUS module 228 consists of one or more executable computer programs that receive requests from clients over a network protocol (TCP/IP) and generates responses to such requests. The EVUS module 228 may have one or more physical databases which are used to efficiently store and index the user profile content vectors and parameters by unique entity IDs.

During normal operation, the EVUS module 228 performs the following processing.

1. Entity insertion and deletion.

The EVUS module 228 inserts new entities or ads and removes old entities or ads from the entity vector database 230 in response to commands from the session compiler module 210. When a new session is compiled, the session compiler module 210 sends update commands, new entity vectors and parameters to the EVUS module 228. Additionally, the session compiler module 210 sends commands to the EVUS module 228 to delete inactive entities from the entity vector database 230.

2. Store and retrieve entity vectors and parameters.

The EVUS module 228 stores and retrieves the current parameters and vectors for all the active entities in the system and retrieves the entity vector and associated parameters for a given entity ID. During the initialization of the RTAS module 214, the RTAS module 214 sends a command to the EVUS module 228 requesting a copy of the most recent entity vectors and parameters to hold in the memory of the RTAS module 214.

3. Entity profile vector adaptation.

FIG. 17 is a block diagram illustrating the entity vector adaptation process of the EVUS module 228 shown in FIG. 2. The EVUS module 228 performs the entity vector adaptation in response to a message indicating that a user has responded to (clicked on) an entity. The EVUS module 228 includes various sub-components including an entity vector adaptation module 2100, a transform query to content vector (TQCV) module 2102, an entity vector lookup module 2104, a profile vector lookup module 2106 and an entity vector database update module 2108.

An adaptation event occurs when a user enters a query 217 or clicks on an ad or performs an on-line purchase of a product 222. When the entity adaptation event occurs, the user action that resulted in the event, such as a user query 217, the EVUS module 228 obtains from the RTAS module 214 the entity ID for the selected ad and the user ID.

If the user requests a query 217, the TQCV module 2102 transforms the actions into a query content vector, and passes the result to the entity vector adaptation module 2100. If the user event was a clickthrough or purchase 222, the entity vector lookup module 2104 retrieves the entity vector for the selected entity from the entity vector database 230. The entity vector lookup module 2104 passes the vector for the selected entity to the entity vector adaptation module 2100. If the user ID was passed into the EVUS module 228, the profile vector lookup module 2106 retrieves the profile vector for the user from the profile vector database 226. The resulting content vector is then passed to the entity vector adaptation module 2100.

After receiving the inputs from the TQCV module 2102, the entity vector lookup module 2104, and the profile vector lookup module 2106, the entity vector adaptation module 2100 performs the equations shown in FIGS. 19A and 19B. The entity vector adaptation module 2100 then passes the updated entity vector along with the entity ID and time stamp to the entity vector database update module 2108 where the information is stored in the entity vector database 230.

4. Time updates.

The EVUS module 228 generates a list of entity IDs whose vectors or parameters that have changed since a given moment in time. This information is used to refresh the memory image of the EVUS module 228 that is maintained by the RTAS module 214. When the refresh command containing a time stamp of the last update is sent from RTAS module 214, the EVUS module 228 sends to the RTAS module 214 the entity IDs, vectors parameters for those items that have changed and a new time stamp. This information is then saved in the RTAS internal memory for use in the entity selection process.

5. Inventory management.

The EVUS module 228 performs inventory management weighting across all the ads in the system. The EVUS module 228 uses a weight parameter to adjust each of the ad selection scores. The weight parameter is determined by the ads targeted number of impressions and the time remaining for each ad.

Profile and Entity Adaptation Algorithms

Figure 18:
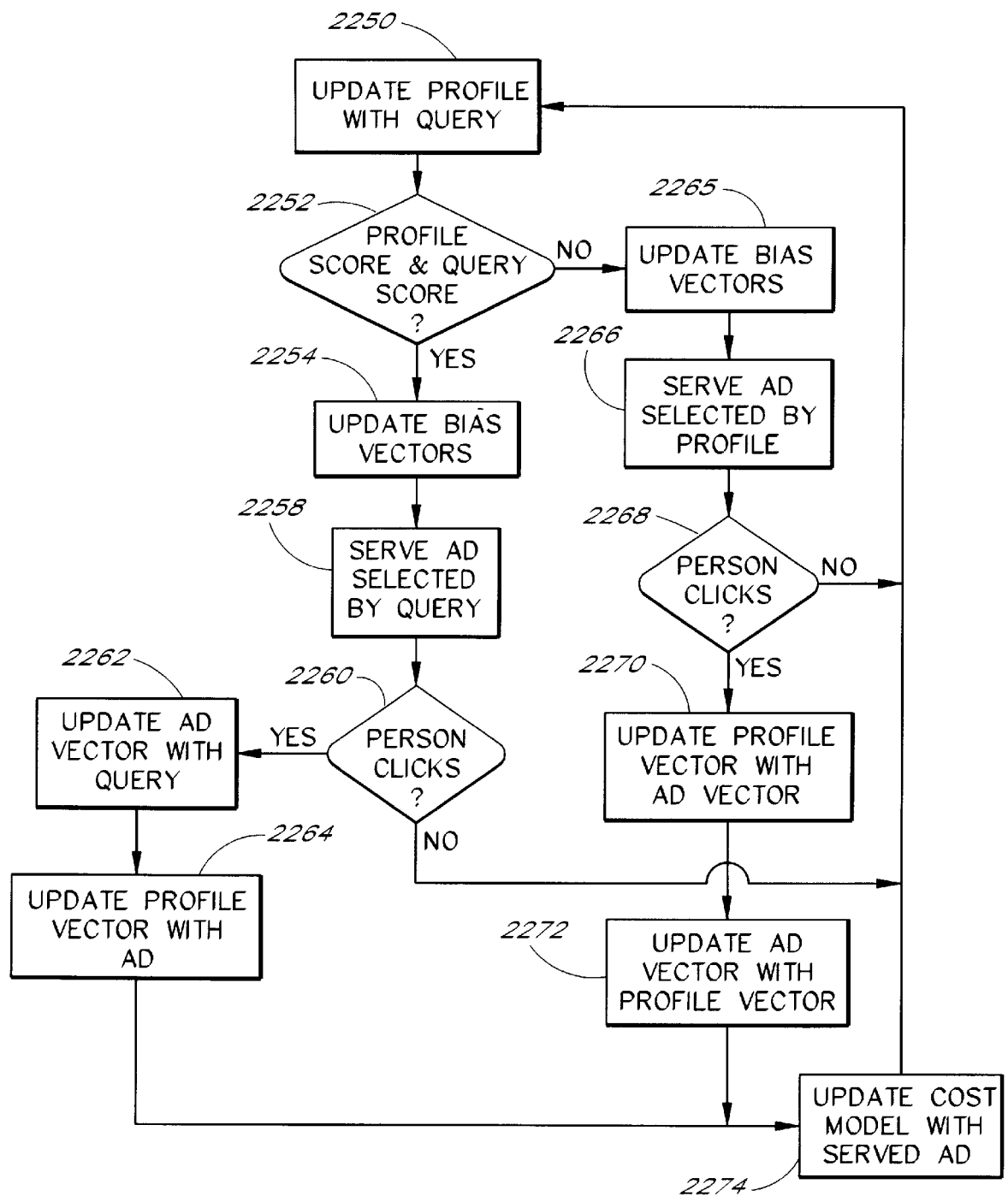
FIG. 18 is a flowchart illustrating the vector adaptation process of the profile vector update server and the entity vector udpdate server shown in FIG. 2.

FIG. 18 is a flowchart illustrating the vector adaptation process of the profile vector update server and the entity vector udpdate server upon the receipt of a user query 217 (shown in FIG. 2). Both the PVUS module 224 and the EVUS module 228 apply a set of adaptation algorithms to allow the evolution of profile vectors and entity vectors as a result of user interaction with the system.

Starting at a state 2250, the PVUS module 224 updates the profile vector based upon the current user query 217. Moving to a decision state 2252, the profile vector of the user and the behavior vector for the search query is compared to the entity vectors and ranked according to this comparison to establish a score. The profile score of the user is compared against the behavior score for the search query to determine which score is larger. If the query score is larger, the PVUS module 224 proceeds to update the bias vectors (state 2254). The bias vectors are used to make sure that during the continual mutual adaptation process that the vectors do not all end up with the same entity vector. Next, at a state 2258 an advertisement is selected based upon the query score.

Proceeding to a decision state 2260, the system checks whether a user clicked on the provided advertisement. If the user did not select the advertisement the system returns to the state 2250 to repeat the adaptation process upon future user queries. If the user selected an advertisement, the EVUS module 228 updates the selected ad vector with the behavior vector for the user query 217 (state 2262). Next, at a state 2264, the PVUS module 224 updates the profile vector with the entity vector for the advertisement and moves to a state 2274.

Referring again to the decision state 2252, if the profile score is greater than the query score, the bias vectors are updated in state 2265. Next, at a state 2266, the ad selected by the profile scoring is sent to the client 219. Proceeding to a decision state 2268, the system checks whether a user clicked on the provided advertisement. If the user did not select the advertisement, the system returns to the state 2250 to repeat the adaptation process upon the receipt of future user queries 217. If the user selected an advertisement, the PVUS module 224 updates the profile vector with the entity vector for the advertisement (state 2270). The EVUS module 228 then updates the selected ad vector with the profile vector for the user query 217.

Moving from a state 2264 or a state 2272, at a state 2274 the cost model associated with the selected advertisement is updated. The system then returns to the state 2250 to repeat the adaptation process upon the receipt of future user queries 217.

The profiles of individual users and the corresponding current query are represented by the following two sets shown in equations 11 and 12.

$$P_{uid} = \{p_1^{(uid)}, \ldots, P_d^{(uid)}\} \quad (11)$$

$$Q_{uid} = \{q_1^{(uid)}, \ldots, q_e^{(uid)}\} \quad (12)$$

User queries includes topical information which may be represented by more than one content vector. Equation 13 shows that each ad is represented in a similar way to the profile vectors.

$$A_{adid} = \{a_1^{(adid)} \ldots a_f^{(adid)}\} \quad (13)$$

Equations 14 and 15 are applied during the decision state 2252 shown in FIG. 15 when computing the scores.

$$p\_score(P_{uid}, A_1, \ldots, A_a) = \max_{i,j,adid}[p_i \cdot a_j^{(adid)} \text{Value}_{adid}] \quad (14)$$

$$q\_score(Q_{uid}, A_1, \ldots, A_a) = \quad (15)$$
$$\max_{i,j,adid}[q_i \cdot a_j^{(adid)} \text{Value}_{adid} \times 1(q_i \cdot a_j^{(adid)} > \text{threshold}_{query})]$$

The Value parameter is computed by traditional cost model algorithms (not shown).

FIGS. 19a and 19b are the equation flow diagrams for the fixed rate learning algorithm performed by the profile vectors update module and the entity vector update module shown in FIG. 2. Unless otherwise noted, the adaptation equations shown in FIGS. 19a and 19b are common to both profile and entity content vector updates. The parameters used to control the adaptation process are shown in FIG. 20.

The following is a description of when the equations illustrated in FIGS. 19a and 19b are performed in relation to the states illustrated in FIG. 18. The equations in a block 2276, 2284 (shown in FIG. 19a) are performed during the state 2250 (shown in FIG. 18) during the process of updating the profile vector with a query. The equations in a block 2278 are performed at the state 2262 during the process of updating the ad vector with a user query after the user selected an advertisement. Similarly, the equations in block 2280 are performed at the state 2264 during the update of the profile vector with the selected advertisement.

The equations in block 2282 (shown in FIG. 19a) are performed at the state 2254 (shown in FIG. 18) to update the bias vectors to insure that all of the vectors do not end up with the same multidimensional vector. The equations in a block 2286 are performed at the state 2272 during the update an ad vector with the profile vector. These equations are performed when the profile score of the user is greater than the query score. Similarly, the equations in a block 2288 (shown in FIG. 19b) are performed in the state 2270 (shown in FIG. 18) during the update of the profile vector with the ad vector.

The equations in a block 2290 (shown in FIG. 19b) are performed during the update of the bias vectors after the profile score of the user is greater than the score for the users query at the state 2265 (shown in FIG. 18).

Calculation of Entity Inventory Weighting (Cost Model)

The RTAS module 214 keeps track of the number of impressions generated for each entity or ad and periodically sends a message to the EVUS module 228 containing each ad ID and the number of impressions generated for each ad. The RTAS module 214 uses the ad parameters specifying the targeted number of impressions and the time each ad will remain eligible for serving to calculate inventory management weights. The weights are applied by the RTAS module 214 when scoring the active ads. The RTAS module 214 causes under-impressed ads to receive more impressions while suppressing impressions for over-impressed ads.

Relationship Discovery and Analysis Processing Module

The present system has the ability to perform relationship discovery and analysis on the contents of the profile vector database 226 and the entity vector database 230 (shown in FIG. 2). The results of the analysis process are listed in a series of reports that are presented to an analyst 240. These reports provide high value actionable information about the behavior pattern of the system users.

The RDA module 236 takes the contents of the profile vector database 226 and the entity vector database 230 to produce the analysis reports 238 (shown in FIG. 2). A variety of conventional statistical techniques or neural network approaches are utilized to perform this analysis.

The RDA module 266 performs three analytical functions including unsupervised categorization, supervised categorization and conventional statistics. Each of these functions is described below.

1. Unsupervised categorization.

The RDA module 236 performs unsupervised categorization or clustering of the contents of the profile vector database 225, the entity vector database 230 or both of these modules. The RDA module 236 may use any clustering algorithm as long as the algorithm can process real number vectors. The result of the clustering is a set of cluster centroid vectors that represent regions of high density. These centroids are the same type of vectors that are used for all the other processing operations. Thus, the RDA system is able to find a set of word vectors that are closest in the content vector space to the centroid vector. The words associated with these vectors, and their closeness metrics, constitute the key concepts of the centroid. The evolution of cluster centroids over time provides trend information. The identification of word vectors close to these cluster centroids provides a key word summary for each cluster, easing the analysis and interpretation task. Conventional statistical analysis may also be used to investigate cluster contents. The variance of cluster membership is a reliable indication of cluster coherence and "unity of focus" in terms of behavior. The cluster identified in the product vector database 226 provides highly valuable information about the characteristics of the users who purchase the products. This result is a natural consequence of the mutual adaptation between the ad vectors and the user content vectors. The number of clusters found and the explanation of the clusters are listed in the analysis reports 238 for inspection by the analyst 240.

2. Supervised categorization.

The RDA module 236 also performs supervised categorization of the contents of the profile vector database 226, the entity vector database 230, or both of these modules. For supervised categorization, the RDA module 236 may employ any algorithm that can process real number vectors. The result of the categorization is a set of users and/or entities that are members of each category. The count and membership list, by category, are listed in the analysis reports 238 for inspection by the analyst 240.

3. Conventional statistics.

The RDA module 236 applies conventional statistics to the contents of the profile vector database 226, the entity vector database 230, or both of these modules. This analysis produces counts, count distributions, means and variances of the database contents as a whole or any subset which is selected by the analyst 240. The results of the processing are listed in the analysis reports 238 for inspection by the analyst 240.

A summary of the operation of the system for the advertising scenario is as follows.

System Initialization

First, the word content vector learning module 200 creates multiple content vectors from text input. This technique, results in a set of word content vectors, one word content vector for each word found in the training vocabulary and not in the stop list 204. In the advertising scenario, the training texts are usually product descriptions and trade magazines. For instance, if the targeted domain of operation is sporting goods, the training corpus would contain the product descriptions from sporting goods catalogs, the contents of several years of "Field and Stream" magazine and books on outdoor life. The selection of the correct training corpus, oriented toward the domain of operation, such as outdoor sports, gives the correct "spin" on the usage of words. In the aforementioned example, "bow" becomes associated with "arrow" as opposed to "violin" or an action performed on stage at the completion of a performance.

Next, the session compiler module 210 computes an initial set of entity vectors from descriptions of the products for sale. These descriptions might come from the product catalog or be typed in by a human operator. For instance, "Warm Goretex, down filled parka perfect for those cold winter nights and days on the ski slopes" might serve as the text initialization for the entity vector for a coat. The entity vector is a normalized weighted sum of the word vectors of the words in the description. The session compiler module 210 creates an initial entity vector for each ad in the system.

The session description file 212 describes the guidelines for ad placement, such as display times authorized, sites, which ads to show and how many impressions are available, is compiled into a machine usable form. This results in the creation of a session control file 215 with information that controls the operation of the ad serving process. Finally, a plurality of user profile vectors are initialized to NULL.

Regular System Operation

During normal operation, an Internet user visits the web site and the user's identity is established via login, or through the web browser cookie. Each user identity is associated with a profile vector. If the user is new, a null profile vector is created and added to the profile vector database. If the user is known to the system, the user's profile vector is retrieved from the profile vector database.

The system then observes the user's behavior. If a user performs a search query 217, the user profile vector is updated using the content vector of the current query. If the user requests a web page to read 218, the user profile vector is modified by the content vector of the requested web page.

The updated profile vector is then used as the basis for selecting relevant ads to display to the user. Relevance is determined by closeness of the user profile vector to entity vectors stored in the ad vector database. The closest entity vector is selected as being most relevant.

If the user is presented an ad, and the user requests more information of the subject of the ad by clicking on the ad, both the current ad entity vector and the profile vector are updated. The user profile vector is moved or adapted a small step in the direction of the entity vector. The entity vector is moved or adapted a small step in the direction of the profile vector of the person who clicked on the ad. Thus, the system allows ads to assume the characteristics of the users that purchase them in a real-time adaptive manner.

Discovery and Analysis Mode

During discovery and analysis mode, at periodic intervals, the system administrator performs relationship discovery and analysis of the contents of both the entity vector database 230 and the user profile vector database 226 to discover useful and exploitable characteristics of user behavior. The RDA module 236 performs vector clustering, reporting and provides summary statistical information of system effectiveness in terms of user clickthrough rate. The behavior clusters discovered during analysis serves as the basis of advertising campaigns and provides valuable insight into user behavioral preferences. The behavior clusters can be utilized as the initial conditions for entity vectors the advertiser wants to target by group, rather than on an individual basis.

The system shown in FIG. 2 has two sets of adaptive components. First are the user profile vectors. Second are the content vectors for each of the advertisements. Both sets of vectors influence each other based upon the actions of the users. Ads are updated in such a manner as to adapt toward regions of high user interest, thus improving system effectiveness and automatically discovering group preferences. User profile vectors adapt based on the observed actions of the user, thus providing an accurate and timely representation of user preferences both individually and as a group.

Since the sets of vectors are dependent on a user's actions and evolve with time, they encode a wealth of information about the behavior of the user population. These content vector sets can be "mined" with the analysis tools to provide valuable actionable insight concerning both individual, group and whole population behavior.

While the above detailed description has shown, described, and pointed out the fundamental novel features of the invention as applied to various embodiments, it will be understood that various omissions and substitutions and changes in the form and details of the system illustrated by those skilled in the art, without departing from the intent of the invention.

What is claimed is:

1. A computerized system for associating an observed behavior with items, comprising:
   a converter capable of converting the observed behavior to a behavior vector;
   a profile adapter capable of modifying a profile vector with the behavior vector; and
   a comparater capable of comparing the modified profile vector to a plurality of entity vectors, the entity vectors indicative of the items, so as to identify at least one entity vector closely associated with the observed behavior.

2. The computerized system as defined in claim 1, wherein the observed behavior is selected from the group consisting of: submitting a query to a web site, requesting a web page, purchasing a product, visiting a merchant, visiting a web site, inquiring about a product, watching a TV show, and watching a movie.

3. The computerized system as defined in claim 1, wherein at least one of the items is selected from the group consisting of: a coupon, an advertisement, a solicitation, information relating to a product, information relating to a set of services, a page, section or chapter of a book, a document, a newspaper article, a movie, a TV show, a web site, and a textual material.

4. The computerized system as defined in claim 1, wherein the computerized system is connected to a network, the network selected from the group consisting of: an intranet, a local area network, and the Internet.

5. The computerized system as defined in claim 1, wherein the converter includes a page content vector lookup module which identifies the behavior vector based upon a page identifier.

6. The computerized system as defined in claim 1, wherein the observed behavior comprises a user query, and wherein the converter includes an entity content vector module for transforming the user query into behavior vectors based upon the component words of the user query.

7. The computerized system as defined in claim 1, wherein the profile adapter modifies the profile vector based upon at least one parameter selected from the group consisting of: a threshold by which a behavior vector will be used instead of the entity vector, a learning rate for a profile update, a leaning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

8. The computerized system as defined in claim 1, wherein the comparater includes a vector closeness determination module to calculate the distance between the modified profile vector and any one of the entity vectors.

9. A system for selecting advertisements in a computer environment, comprising:
   a database of electronic advertisements; and
   an electronic advertisement management system, comprising:
      a converter capable of converting an observed behavior of a user computing device in the computer environment to a behavior vector,
      a profile adapter capable of modifying a profile vector indicative of the user with the behavior vector,
      a comparater capable of comparing the modified profile vector to a plurality of entity vectors, the entity vectors indicative of the electronic advertisements, so as to identify at least one entity vector closely associated with the observed behavior, and
      a selector accessing the electronic database with the identified entity vector so as to select at least one electronic advertisement to communicate to the user computing device.

10. The system as defined in claim 9, wherein the selector includes inventory management to allow selection of an entity that is under-selected according to the selection schedule and to inhibit the selection of an entity that is over-selected according to the selection schedule.

11. The system as defined in claim 9, wherein the selector includes inventory management to allow selection of the entity vector based upon a presentation delivery schedule.

12. The system as defined in claim 9, wherein the observed behavior is selected from the group consisting of: submitting a query to a web site, requesting a web page, purchasing a product, visiting a merchant, visiting a web site, inquiring about a product, watching a TV show, and watching a movie.

13. The system as defined in claim 9, wherein the computer environment is connected to a network, the network selected from the group consisting of: an intranet, a local area network, and the Internet.

14. The system as defined in claim 9, wherein the converter includes a page content vector lookup module which identifies the behavior vector based upon a page identifier.

15. The system as defined in claim 9, wherein the observed behavior is selected from the group consisting of: a user query, a page view, or a purchase of a product.

16. The system as defined in claim 9, wherein the profile adapter modifies the profile vector based upon at least one parameter selected from the group consisting of: a threshold by which a behavior vector will be used instead of the entity vector, a learning rate for a profile update, a leaning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

17. The system as defined in claim 9, wherein the comparater includes a vector closeness determination module to calculate the distance between the modified profile vector and any one of the entity vectors.

18. A computerized system for adapting an entity vector, comprising:
   a converter capable of converting an observed behavior of a user into a behavior vector;
   a profile adapter capable of modifying a profile vector indicative of the user based on the behavior vector; and
   an entity adapter capable of modifying an entity vector indicative of an item based on the profile vector or the behavior vector.

19. The system as defined in claim 18, wherein at least one of the items is selected from the group consisting of: a coupon, an advertisement, a solicitation, information relating to a product, information relating to a set of services, a page, a section or a chapter of a book, a document, a newspaper article, a movie, a TV show, a web site, and a textual material.

20. The system as defined in claim 18, wherein the observed behavior is selected from the group consisting of: submitting a query to a web site, requesting a web page, purchasing, a product, visiting a merchant, visiting a web site, inquiring about a product, watching a TV show, and watching a movie.

21. The system as defined in claim 18, wherein the computerized system is connected to a network, the network selected from the group consisting of: an intranet, a local area network, and the Internet.

22. The system as defined in claim 18, wherein the converter includes a page content vector lookup module which identifies the behavior vector based upon a page identifier.

23. The system as defined in claim 18, wherein the observed behavior is selected from the group consisting of: a user query, a page view, or a purchase of a product.

24. The system as defined in claim 18, wherein the profile adapter modifies the profile vector based upon at least one parameter selected from the group consisting of: a threshold by which a behavior vector will be used instead of the entity vector, a learning rate for a profile update, a learning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

25. The system as defined in claim 18, wherein the entity adapter modifies the entity vector based upon at least one parameter selected from the group consisting of: a threshold by which a behavior vector will be used instead of the profile vector, a leaning rate for a profile update, a learning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

26. A system for generating a profile vector in a computer environment, comprising:
    a converter capable of converting a plurality of observed behaviors of a user into an associated plurality of behavior vectors; and
    a profile adapter capable of repeatedly modifying a profile vector indicative of the user based on the plurality of behavior vectors.

27. The system as defined in claim 26, wherein at least one of the plurality of observed user behaviors is selected from the group consisting of: submitting a query to a web site, requesting a web page, purchasing a product, visiting a merchant, visiting a web site, inquiring about a product, watching a TV show, and watching a movie.

28. The system as defined in claim 26, wherein the computer environment is connected to a network, the network selected from the group consisting of: an intranet, a local area network, and the Internet.

29. The system as defined in claim 26, wherein the observed behavior is selected from the group, consisting of: a user query, a page view, or a purchase of a product.

30. The system as defined in claim 26, wherein the profile adapter includes modifies the profile vector based upon at least one parameter selected from the group consisting of: a threshold by which a behavior vector will be used instead of the profile vector, a learning rate for a profile update, a learning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

31. A computerized system for adapting an entity vector, comprising:

a converter capable of converting an observed behavior of a user into a behavior vector; and
    an entity adapter capable of modifying an entity vector indicative of an item based on the behavior vector.

32. The system as defined in claim 31, wherein observed behavior is selected from the group consisting of: submitting a query to a web site, requesting a web page, purchasing a product, visiting a merchant, visiting a web site, inquiring about a product, watching a TV show, and watching a movie.

33. The system as defined in claim 31, wherein the computerized system is connected to a network, the network selected from the group consisting of: an intranet, a local area network, and the Internet.

34. The system as defined in claim 31, wherein the converter includes a page content vector lookup module which identifies the behavior entity vector based upon a page identifier.

35. The system as defined in claim 31, wherein the observed behavior is selected from the group consisting of: a user query, a page view, or a purchase of a product.

36. The system as defined in claim 31, wherein the item is selected from the group consisting of: a coupon, an advertisement, a solicitation, information relating to a product, information relating to a set of services, a page, a section or a chapter of a book, a document, a newspaper article, a movie, a TV show, a web site, and a textual material.

37. A system for selecting advertisements in a computer environment, comprising:
    a database of electronic advertisements; and
    an electronic advertisement management system, comprising:
        a converter capable of converting an observed behavior of a user computing device in the computer environment to a behavior vector,
        a comparater capable of comparing the behavior vector to a plurality of entity vectors, the entity vectors indicative of the electronic advertisements, so as to identify at least one entity vector closely associated with the observed behavior, and
        a selector accessing the electronic database with the identified entity vector so as to select at least one electronic advertisement to communicate to the user computing device.

38. The system as defined in claim 37, wherein the computer environment is connected to a network, the network selected from the group consisting of: an intranet, a local area network, and the Internet.

39. The system as defined in claim 37, wherein the converter includes a page content vector lookup module which identifies the behavior vector based upon a page identifier.

40. The system as defined in claim 37, wherein the observed behavior is selected from the group consisting of: a user query, a page view, or a purchase of a product.

41. The system as defined in claim 37, wherein the comparater includes a vector closeness determination module to calculate the distance between the behavior vector and any one of the entity vectors.

42. The system as defined in claim 37, wherein the selector includes inventory management to allow selection of the entity vector of an entity being under-selected according to a selection schedule and inhibit the selection of an entity that is over-selected according to the selection schedule.

43. The system as defined in claim 37, wherein the selector includes inventory management to allow selection of the entity based upon a presentation delivery schedule.

44. A method of associating an observed behavior with items on a computer including a data storage, comprising:

converting an observed behavior to a behavior vector;

modifying a profile vector with the behavior vector, and comparing the modified profile vector to a plurality of entity vectors, the entity vectors indicative of the items, so as to identify at least one entity vector closely associated with the observed behavior.

45. The method as defined in claim 44, wherein the observed user behavior is selected from the group consisting of: submitting a query to a web site, requesting a web page, purchasing a product, visiting a merchant, visiting a web site, inquiring about a product, watching a TV show, and watching a movie.

46. The method as defined in claim 44, wherein at least one of the items is selected from the group consisting of: a coupon, an advertisement, a solicitation, information relating to a product, information relating to a set of services, a page, a section or a chapter of a book, a document, a newspaper article, a movie, a TV show, a web site, and a textual material.

47. The method as defined in claim 44, wherein the converting step identifies the behavior vector based upon a page identifier.

48. The method as defined in claim 44, wherein the observed user behavior comprises a user query, and the converting step transforms the user query into vectors based upon the component words of the user query.

49. The method as defined in claim 44, wherein the comparing step calculates the distance between the modified profile vector and any one of the entity vectors.

50. A method of selecting advertisements in a computer environment, comprising:

providing a database of electronic advertisements;

converting an observed behavior of a user computing device in the computer environment to a behavior vector, modifying a profile vector indicative of the user with the behavior vector;

comparing the modified profile vector to a plurality of entity vectors, the entity vectors indicative of the electronic advertisements, so as to identify at least one entity vector closely associated with the observed behavior;

accessing the electronic database with the identified entity vector; and selecting at least one electronic advertisement to communicate to the user computing device.

51. The method as defined in claim 50, wherein the selecting includes selecting an electronic advertisement that is under-selected according to a selection schedule and to inhibit the selection of an electronic advertisement that is over-selected according to the selection schedule.

52. The method as defined in claim 50, wherein the selecting includes selecting the entity vector based upon a presentation delivery schedule.

53. The method as defined in claim 50, wherein the modifying includes modifying the profile vector based upon at least one parameter selected from the group consisting of: a threshold by which a behavior vector will be used instead of the entity vector, a learning rate for a profile update, a learning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of query vectors.

54. The method as defined in claim 50, wherein the electronic advertisement is communicated to the user computing device via a network, the network selected from the group consisting of an intranet, a local area network, and the Internet.

55. The method as defined in claim 50, wherein the observed user behavior is selected from the group consisting of: submitting a query to a web site, requesting a web page, purchasing a product, visiting a merchant, visiting a web site, inquiring about a product, watching a TV show, and watching a movie.

56. The method as defined in claim 50, wherein the converting includes identifying the behavior vector based upon a page identifier.

57. The method as defined in claim 50, wherein the observed user behavior comprises a user query, and the converting includes transforming the user query into behavior vectors based upon the component words of the user query.

58. A method for adapting an entity vector on a computer including a data storage, comprising:

converting an observed behavior of a user into a behavior vector;

modifying a profile vector indicative of the user based on the behavior vector; and modifying an entity vector indicative of an item based on the profile vector or the behavior vector.

59. The method as defined in claim 58, wherein at least one of the items is selected from the group consisting of: a coupon, an advertisement, information relating to a solicitation, information relating to a product, a set of services, a page, a section or a chapter of a book, a document, a newspaper article, a movie, a TV show, a web site, and a textual material.

60. The method as defined in claim 58, wherein the modifying the profile vector includes modifying the profile vector based upon at least one parameter selected from the group consisting of: a threshold by which a behavior vector will be used instead of the entity vector, a learning rate for a profile update, a learning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

61. The method as defined in claim 58, wherein the modifying the entity vector includes modifying the profile vector based upon at least one parameter selected from the group consisting of: a threshold by which a behavior vector will be used instead of the profile vector, a learning rate for a profile update, a learning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

62. The method as defined in claim 58, wherein the computer is connected to a network, the network selected from the group consisting of: an intranet, a local area network, and the Internet.

63. The method as defined in claim 58, wherein the observed user behavior is selected from the group consisting of: submitting a query to a web site, requesting a web page, purchasing a product, visiting a merchant, visiting a web site, inquiring about a product, watching a TV show, and watching a movie.

64. The method as defined in claim 58, wherein the converting includes identifying identifies the behavior vector based upon a page identifier.

65. The method as defined in claim 58, wherein the observed user behavior comprises a user query, and the converting includes transforming the user query into vectors based upon the component words of the user query.

66. A method of generating a profile vector in a computer environment on a computer including a data storage, comprising:

converting a plurality of observed behaviors of a user into an associated plurality of behavior vectors; and repeatedly modifying a profile vector indicative of the user based on the plurality of behavior vectors.

67. The method as defined in claim 66, wherein the computer environment is connected to a network, the network selected from the group consisting of: an intranet, a local area network, and the Internet.

68. The method as defined in claim 66, wherein the observed user behavior is selected from the group consisting of: submitting a query to a web site, requesting a web page, purchasing a product, visiting a merchant, visiting a web site, inquiring about a product, watching a TV show, and watching a movie.

69. The method as defined in claim 66, wherein the converting includes identifying the behavior vector based upon a page identifier.

70. The method as defined in claim 66, wherein the observed user behavior comprises a user query, and the converting includes transforming the user query into vectors based upon the component words of the user query.

71. A method of adapting an entity vector on a computer including a data storage, comprising:

converting an observed behavior of a user into a behavior vector, and modifying an entity vector indicative of an item based on the behavior vector.

72. The method as defined in claim 71, wherein at least one of the items are selected from the group consisting of: a coupon, an advertisement, a solicitation, information relating to a product, information relating to a set of services, a page, a section or chapter of a book, a document, a newspaper article, a movie, a TV show, a web site, and a textual material.

73. The method as defined in claim 71, wherein the computer is connected to a network, the network selected from the group consisting of: an intranet, a local area network, and the Internet.

74. The method as defined in claim 71, wherein the observed user behavior is selected from the group consisting of: submitting a query to a web site, requesting a web page, purchasing a product, visiting a merchant, visiting a web site, inquiring about a product, watching a TV show, and watching a movie.

75. The method as defined in claim 71, wherein the converting includes identifying the behavior vector based upon a page identifier.

76. The method as defined in claim 71, wherein the observed user behavior comprises a user query, and the converting includes transforming the user query into vectors based upon the component words of the user query.

77. The method as defined in claim 71, wherein the modifying step including modifying for the entity vector modifies the behavior vector based upon at least one parameter selected from the group consisting of: a threshold by which a behavior vector will be used instead of the profile vector, a learning rate for a profile update, a learning rate for an entity update, an update rate for a query universe estimate of a mean, an update for a profile universe update of a mean, a forgetting factor for a set of profile vectors, a forgetting factor for a set of entity vectors, a mean of a set of entity vectors, a mean of a set profile vectors, and a mean of a set of behavior vectors.

78. A method of selecting advertisements in a computer including a data storage, comprising:

providing a database of electronic advertisements;

converting an observed behavior of a user computing device in the computer to a behavior vector;

comparing the behavior vector to a plurality of entity vectors, the entity vectors indicative of the electronic advertisements, so as to identify at least one entity vector closely associated with the observed behavior;

accessing the electronic database with the identified entity vector, and selecting at least one electronic advertisement to communicate to the user computing device.

79. The method as defined in claim 78, wherein the selecting includes selecting an electronic advertisement that is under-selected according to a selection schedule and inhibiting the selection of an electronic advertisement that is over-selected according to the selection schedule.

80. The method as defined in claim 78, wherein the selecting includes selecting the entity vector based upon a presentation delivery schedule.

81. The method as defined in claim 78, wherein the comparing includes calculating the distance between the behavior vectors to any one of the entity vectors.

82. The method as defined in claim 78, wherein the at least one electronic advertisement is communicated to the user computing device via a network, the network selected from the group consisting of: an intranet, a local area network, and the Internet.

83. The method as defined in claim 78, wherein the observed user behavior is selected from the group consisting of: submitting a query to a web site, requesting a web page, purchasing a product, visiting a merchant, visiting a web site, inquiring about a product, watching a TV show, and watching a movie.

84. The method as defined in claim 78, wherein the converting includes identifying the behavior vector based upon a page identifier.

85. The method as defined in claim 78, wherein the observed user behavior comprises a user query, and the converting includes transforming the user query into vectors based upon the component words of the user query.

* * * * *